(12) United States Patent
Hirata et al.

(10) Patent No.: US 10,466,699 B2
(45) Date of Patent: Nov. 5, 2019

(54) AUTONOMOUS TRAVEL DEVICE

(71) Applicant: Sharp Kabushiki Kaisha, Sakai, Osaka (JP)

(72) Inventors: Kiyotaka Hirata, Sakai (JP); Atsushi Higuchi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 135 days.

(21) Appl. No.: 15/543,592

(22) PCT Filed: Feb. 1, 2016

(86) PCT No.: PCT/JP2016/052880
§ 371 (c)(1),
(2) Date: Jul. 14, 2017

(87) PCT Pub. No.: WO2016/125728
PCT Pub. Date: Aug. 11, 2016

(65) Prior Publication Data
US 2017/0364075 A1 Dec. 21, 2017

(30) Foreign Application Priority Data

Feb. 2, 2015 (JP) .................................. 2015-018229
Jan. 25, 2016 (JP) .................................. 2016-011479

(51) Int. Cl.
B60L 11/08 (2006.01)
B60K 1/04 (2019.01)
(Continued)

(52) U.S. Cl.
CPC ............ G05D 1/0088 (2013.01); B60K 11/00 (2013.01); B60L 50/53 (2019.02); B60K 1/04 (2013.01);
(Continued)

(58) Field of Classification Search
CPC .. B60K 11/00; B60K 1/04; B60K 2001/0477; B60K 2001/0483; B60K 2001/0494; B60K 2001/0455
See application file for complete search history.

(56) References Cited

U.S. PATENT DOCUMENTS 5,360,307 A * 11/1994 Schemm .................. B60K 1/04
414/343
5,760,569 A *  6/1998 Chase, Jr. ................ B60K 1/04
320/104
(Continued)

FOREIGN PATENT DOCUMENTS

CN        1703333 A     11/2005
CN     201405716 Y      2/2010
(Continued)

OTHER PUBLICATIONS

Official Communication issued in International Patent Application No. PCT/JP2016/052880, dated Apr. 26, 2016.

Primary Examiner — Tony H Winner
(74) Attorney, Agent, or Firm — Keating & Bennett, LLP

(57) ABSTRACT

An autonomous travel device is provided with wheels, a device main body, a power source that is provided on one end portion of the device main body within the device main body and causes the device main body to travel autonomously by driving the wheels, a battery for supplying power to the power source, and an accommodation unit for accommodating the battery from the other end portion of the device main body to a central portion of the device main body within the device main body. With this configuration, it is possible to easily perform replacement of the battery, and therefore, it is possible to perform autonomous travel that is stabilized due to disposition of the battery in consideration of the center of gravity of the device main body.

11 Claims, 19 Drawing Sheets

(51) Int. Cl.
*G05D 1/00* (2006.01)
*B60K 11/00* (2006.01)
*B60L 50/53* (2019.01)

(52) U.S. Cl.
CPC ... *B60K 2001/0477* (2013.01); *B60L 2220/56* (2013.01); *B60L 2260/32* (2013.01); *Y02T 10/641* (2013.01); *Y02T 10/7005* (2013.01)

(56) References Cited

U.S. PATENT DOCUMENTS

| | | | |
|---|---|---|---|
| 2005/0274556 A1* | 12/2005 | Chaney | B60K 1/04 180/68.5 |
| 2006/0102398 A1 | 5/2006 | Mizuno | |
| 2007/0012496 A1* | 1/2007 | Chene | B60K 1/04 180/68.5 |
| 2008/0006459 A1* | 1/2008 | Niebuhr | B60K 1/04 180/68.5 |
| 2013/0256046 A1 | 10/2013 | Kyoden et al. | |
| 2013/0319782 A1 | 12/2013 | Matsuda | |
| 2014/0110183 A1 | 4/2014 | Rudakevych et al. | |
| 2017/0327000 A1 | 11/2017 | Wada et al. | |
| 2017/0334279 A1* | 11/2017 | Higuchi | B60L 50/64 |
| 2017/0349039 A1* | 12/2017 | Rayner | B60L 53/68 |
| 2018/0108891 A1* | 4/2018 | Fees | B60K 1/04 |
| 2019/0029489 A1* | 1/2019 | Jang | A47L 11/4066 |

FOREIGN PATENT DOCUMENTS

| | | |
|---|---|---|
| CN | 202006771 U | 10/2011 |
| CN | 102347459 A | 2/2012 |
| CN | 103359230 A | 10/2013 |
| CN | 204020521 U | 12/2014 |
| JP | 58-141604 A | 8/1983 |
| JP | 04-076101 U | 7/1992 |
| JP | 08-252203 A | 10/1996 |
| JP | 2004-098728 A | 4/2004 |
| JP | 2006-324955 A | 11/2006 |
| JP | 2010-095251 A | 4/2010 |
| JP | 2012-192782 A | 10/2012 |
| JP | 2015-047987 A | 3/2015 |
| JP | 6071977 B2 | 2/2017 |
| WO | 2012/085976 A1 | 6/2012 |

* cited by examiner

FIG. 5
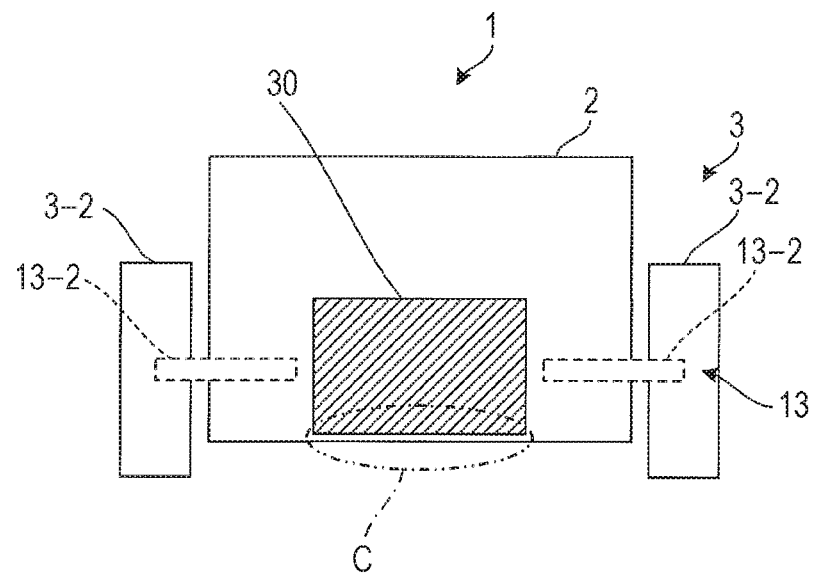
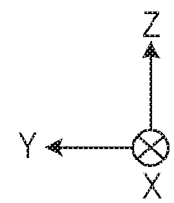
FIG. 6
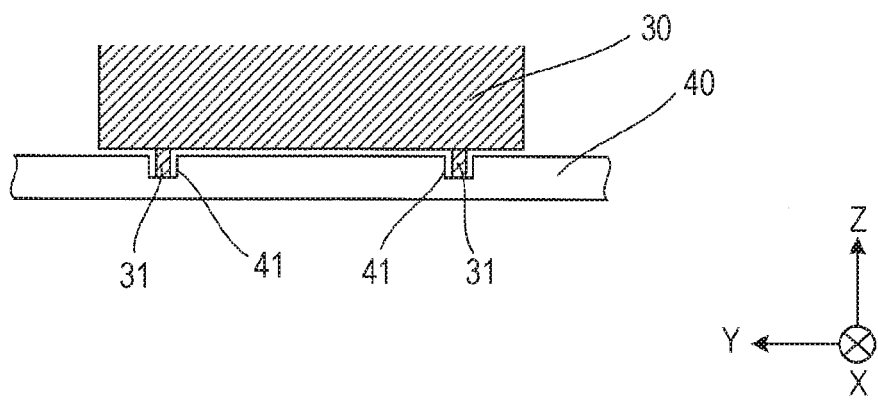
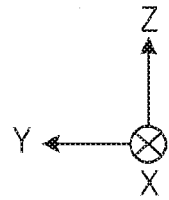

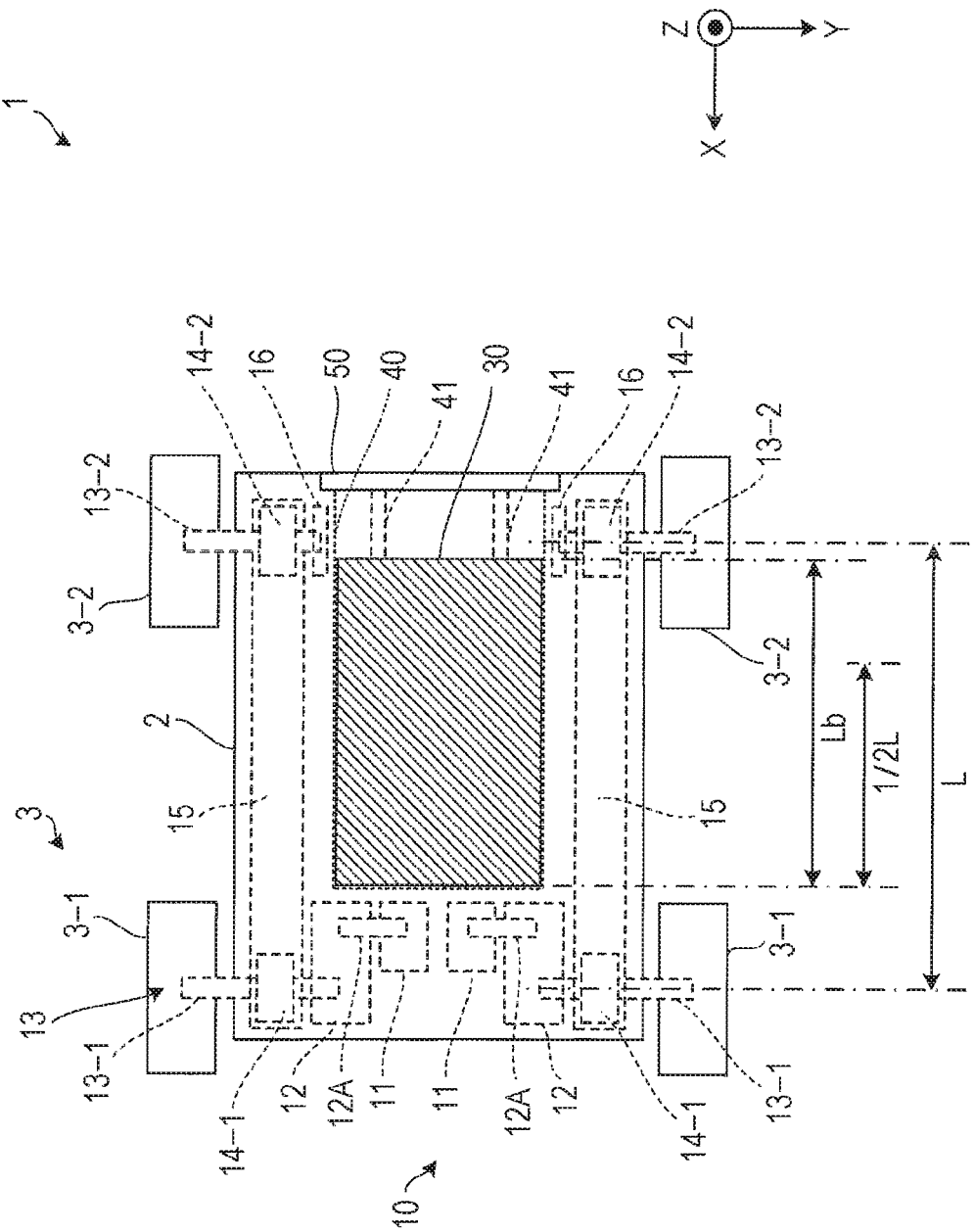

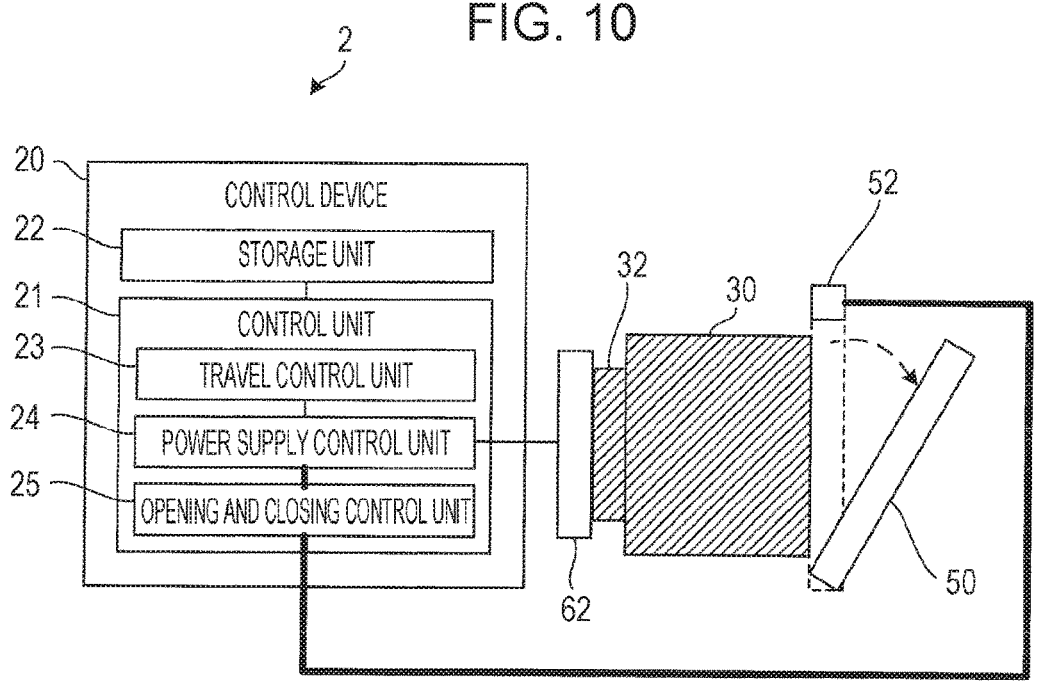
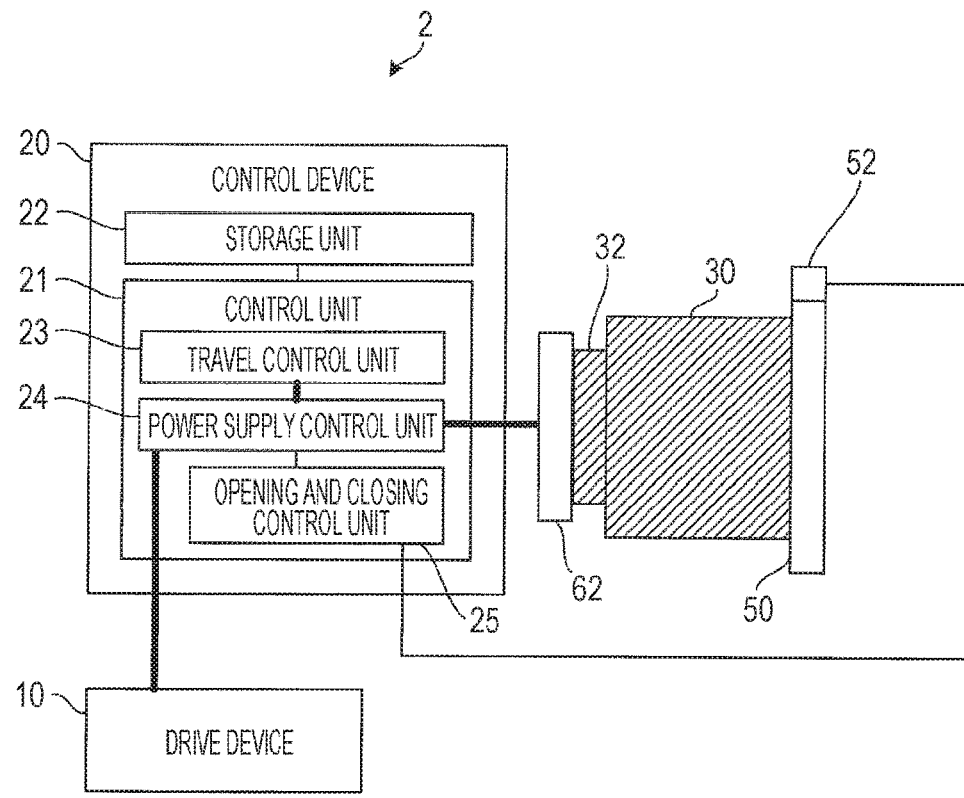

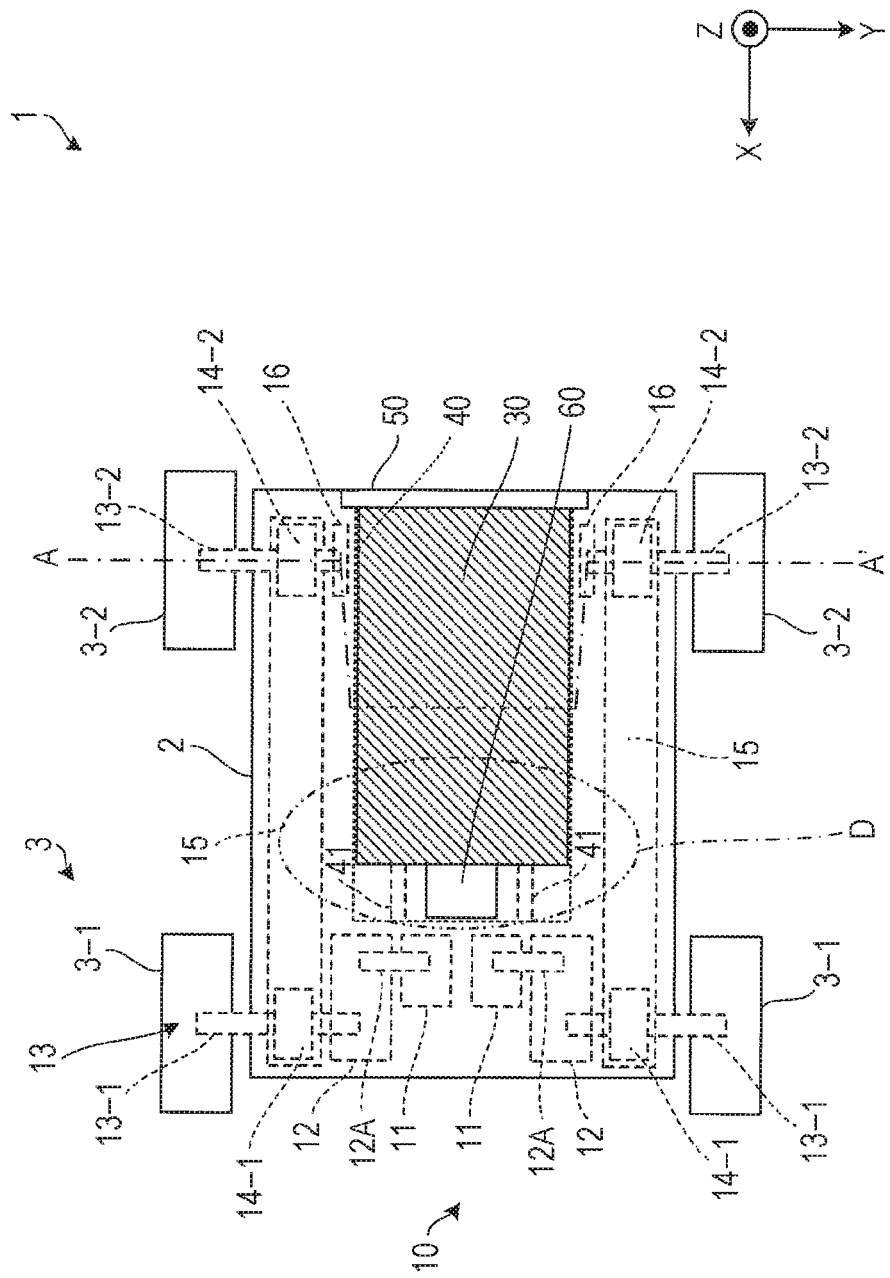

FIG. 19
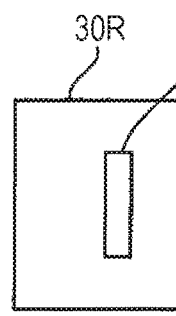
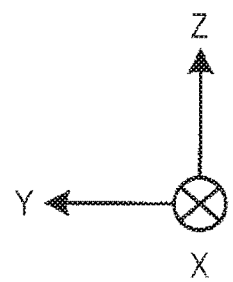
FIG. 20
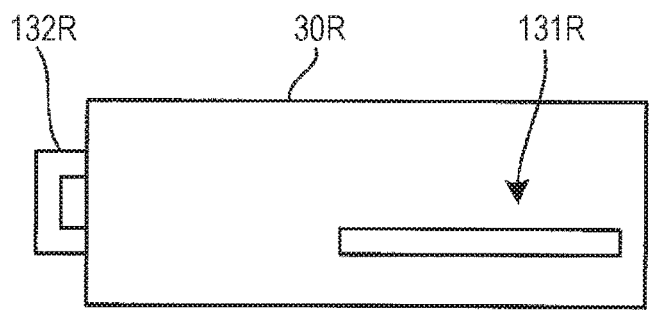
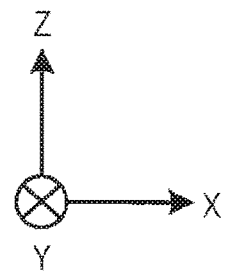

AUTONOMOUS TRAVEL DEVICE

TECHNICAL FIELD

The present invention relates to an autonomous travel device that travels autonomously by driving wheels.

BACKGROUND ART

An autonomous travel device that travels autonomously by driving wheels has been developed. For example, the autonomous travel device can be used in a case of monitoring an obstacle on a monitoring route (a patrol pathway), or the like. In this case, the autonomous travel device travels autonomously on a monitoring route at a set speed, which is set in advance.

Such an autonomous travel device includes wheels, a device main body, a power source, and a battery. The battery supplies power to a power source. The power source causes the device main body to travel autonomously by driving the wheels using power of the battery.

In a case in which an electric motor, or the like, is used as a power source, a large-capacity battery is necessary in the autonomous travel device. However, a large-capacity battery takes a lot of time to charge. Therefore, a method for replacing the entire battery is used. In this manner, in an autonomous travel device, it is desirable to make replacement of the battery easy in order to allow replacement of the battery to be performed rapidly.

In addition, if the capacity of the battery is increased in the manner of a large-capacity battery, the weight of the battery is also increased. A power source is also a heavy mechanism unit, but the weight of the battery is the heaviest among the members of the autonomous travel device. That is, the center of gravity of the autonomous travel device (the device main body) changes greatly depending on the disposition of the battery. Therefore, in the autonomous travel device, it is desirable to dispose the battery in consideration of the center of gravity of the device main body in order to allow stabilized autonomous travelling.

PTL 1 discloses a vehicle (an electric vehicle) equipped with a battery. In the technique disclosed in PTL 1, a battery replacement device for replacing a battery is provided below a vehicle body and allows replacement of the battery from below the vehicle body. The battery replacement device is provided below a ground contact surface of wheels between left and right wheels. In the technique disclosed in PTL 1, it is possible to easily perform replacement of the battery by using the battery replacement device.

PTL 2 discloses a vehicle (a passenger vehicle) equipped with a battery. In the technique disclosed in PTL 2, a partition is provided in a supplementary unit chamber, which is provided in a vehicle body, and a battery is disposed therein. In the technique disclosed in PTL 2, it is possible to easily perform replacement of the battery by using the partition.

CITATION LIST

Patent Literature

PTL 1: Japanese Unexamined Patent Application Publication No. 2012-192782

PTL 2: Japanese Unexamined Patent Application Publication No. 2010-95251

SUMMARY OF INVENTION

Technical Problem

However, in the techniques disclosed in PTLs 1 and 2, a passenger vehicle is equipped with a battery, but the weight of the vehicle body is considerably more than the weight of the battery in a case of a passenger vehicle. Therefore, in the techniques disclosed in PTLs 1 and 2, the center of gravity of the vehicle body is established by the disposition of a plurality of mechanism units in addition to the disposition of a battery and the disposition of a power source. In this manner, a passenger vehicle is different from an autonomous travel device in which the center of gravity of the device main body changes greatly depending on the disposition of a battery.

The present invention was devised in the light of the above-mentioned problems of the related art, and an object thereof is to provide an autonomous travel device in which it is possible to easily perform replacement of the battery, and therefore, it is possible to perform autonomous travel that is stabilized due to disposition of the battery in consideration of the center of gravity of the device main body.

Solution to Problem

An autonomous travel device of the present invention is provided with wheels, a device main body, a power source that is provided on one end portion of the device main body within the device main body and causes the device main body to travel autonomously by driving the wheels, a battery for supplying power to the power source, and an accommodation unit for accommodating the battery from the other end portion of the device main body to a central portion of the device main body within the device main body.

Advantageous Effects of Invention

According to the present invention, in an autonomous travel device, it is possible to easily perform replacement of a battery, and therefore, it is possible to perform autonomous travel that is stabilized due to disposition of the battery in consideration of the center of gravity of the device main body.

BRIEF DESCRIPTION OF DRAWINGS

FIG. 5 is a cross-sectional view taken along line B-B' of FIG. 2 in the autonomous travel device 1 according to the first embodiment.

FIG. 6 is an enlarged view of a portion C of FIG. 5 in the autonomous travel device 1 according to the first embodiment.

FIG. 9 is an upper surface cross-sectional view of an autonomous travel device 1 according to a third embodiment.

FIG. 10 is a block diagram that illustrates an electrical configuration of an autonomous travel device 1 according to a fourth embodiment.

FIG. 11 is a block diagram that illustrates an electrical configuration of the autonomous travel device 1 according to the fourth embodiment, and is a view for describing an opening and closing operation of a door 50 in the autonomous travel device 1 according to the fourth embodiment.

FIG. 12 is an upper surface cross-sectional view of an autonomous travel device 1 according to a fifth embodiment.

FIG. 19 is a front view of a battery 30R in the autonomous travel device 1 according to the application example.

FIG. 20 is a right side surface view of the battery 30R in the autonomous travel device 1 according to the application example.

DESCRIPTION OF EMBODIMENTS

Hereinafter, embodiments will be described with reference to the drawings.

First Embodiment

Figure 1:
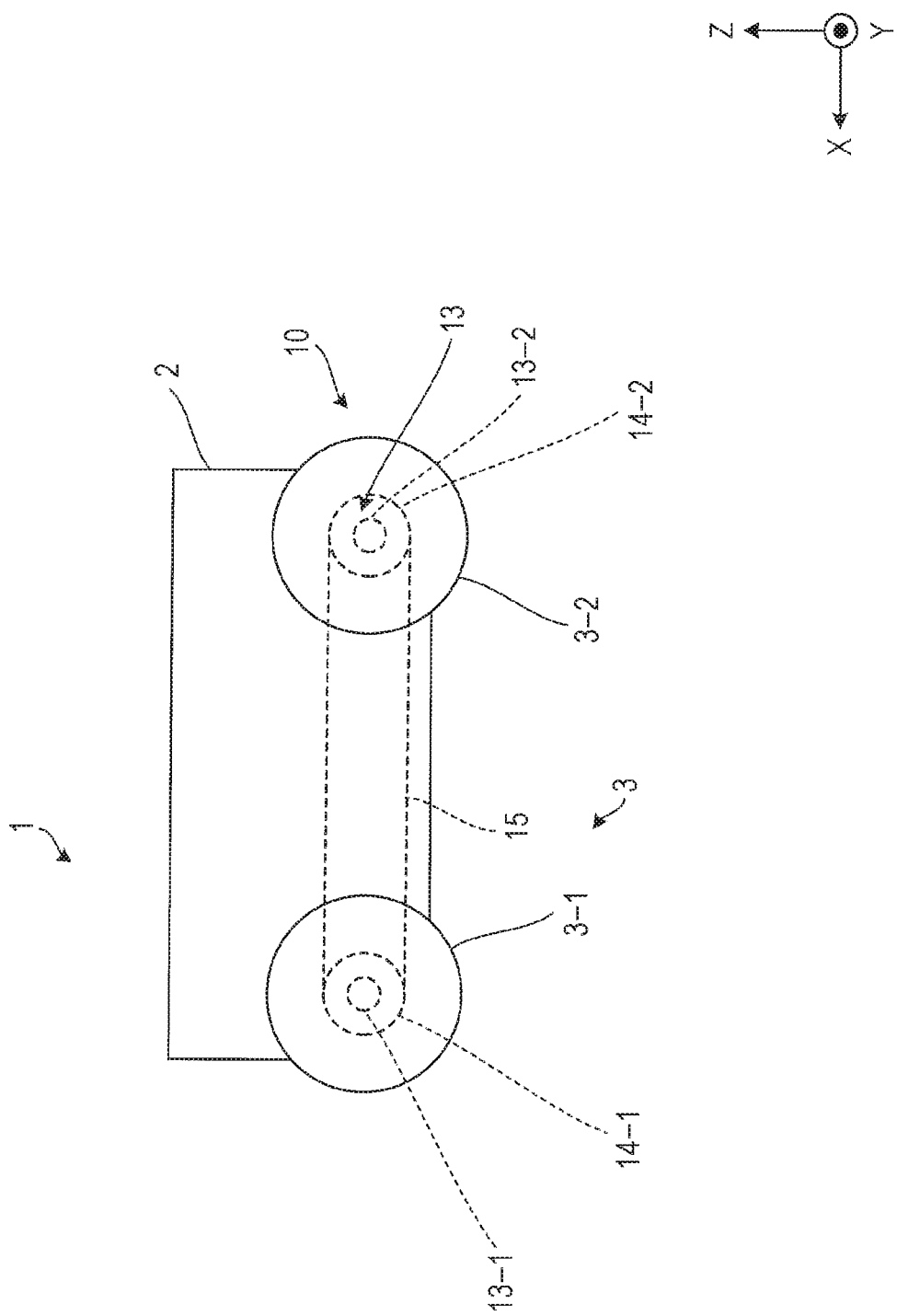
FIG. 1 is a side view of an autonomous travel device 1 according to a first embodiment.
Figure 2:
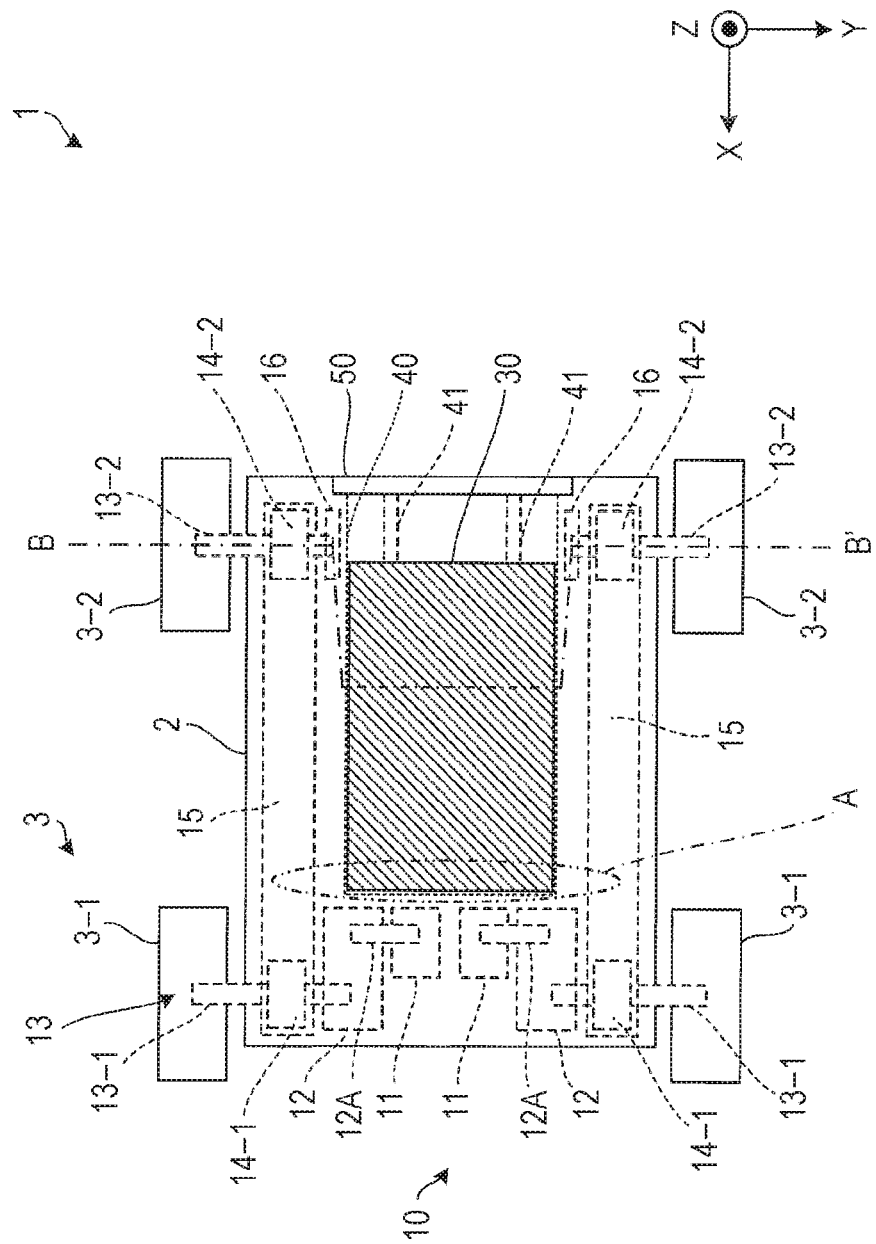
FIG. 2 is an upper surface cross-sectional view of the autonomous travel device 1 according to the first embodiment.

FIG. 1 is a side view of an autonomous travel device 1 according to a first embodiment, and FIG. 2 is an upper surface cross-sectional view of the autonomous travel device 1 according to the first embodiment.

As illustrated in FIGS. 1 and 2, the autonomous travel device 1 includes a device main body 2, a drive device 10, and four wheels 3. The four wheels 3 are divided into left and right front wheels 3-1 and left and right rear wheels 3-2.

In this instance, as illustrated by FIGS. 1 and 2, in the present embodiment, a direction from a back surface (the rear) of the device main body 2 to a front surface (the front) of the device main body 2 is referred to as an X direction. In addition, a direction from a side surface on the right side of the device main body 2 to a side surface on the left side of the device main body 2, which is perpendicular to the X direction, is referred to as a Y direction. In addition, a direction from a bottom surface of the device main body 2 to an upper surface, which is perpendicular to the X direction and the Y direction, is referred to as a Z direction.

The drive device 10 drives the wheels 3. The drive device 10 includes left and right electric motors 11, left and right transmissions 12, four axles 13, left and right front wheel sprockets 14-1, left and right rear wheel sprockets 14-2, left and right belts 15, and left and right bearings 16. The four axles 13 are divided into left and right front wheel shafts 13-1 and left and right rear wheel shafts 13-2.

Among the drive device 10, the heavy mechanism units (the power sources) such as the left and right electric motors 11 are provided on one end portion side of the device main body 2 within the device main body 2. For example, in a case in which one end portion side of the device main body 2 is defined as a front surface side (a front side) of the device main body 2, the power sources (the left and right electric motors 11, and the like) are provided on the front surface side (the front side) of the device main body 2. In this case, among the four wheels 3, the left and right front wheels 3-1 are referred to as driving wheels, and the left and right rear wheels 3-2 are referred to as driven wheels.

One end of each of the left and right front wheel shafts 13-1 is connected to one of the left and right front wheels 3-1, and the other end is connected to one of the left and right transmissions 12. Each of the left and right transmissions 12 is connected to one of the left and right electric motors 11. The left and right electric motors 11 are controlled by a control device 20 (refer to FIG. 3), which will be mentioned later.

One end of each of the left and right rear wheel shafts 13-2 is connected to one of the left and right rear wheels 3-2, and the other end is connected to one of the left and right bearings 16.

A left side front wheel shaft 13-1 and a left side rear wheel shaft 13-2 are respectively provided at the centers of a left side front wheel sprocket 14-1 and a left side rear wheel sprocket 14-2. A left side belt 15 is provided at the outer periphery of the left side front wheel sprocket 14-1 and the left side rear wheel sprocket 14-2, and a left side front wheel 3-1 (a driving wheel) and left side rear wheel 3-2 (a driven wheel) are coupled by the left side belt 15.

The left side front wheel 3-1 (the driving wheel) receives power of a left side electric motor 11 via a left side transmission 12, and rotates together with the left side front wheel shaft 13-1 and the left side front wheel sprocket 14-1 on the basis of the power. The left side rear wheel 3-2 (the driven wheel) receives rotational motion of the left side front wheel 3-1 (the driving wheel) from the left side belt 15, and rotates together with the left side rear wheel shaft 13-2 and the left side rear wheel sprocket 14-2 on the basis of the rotational motion.

A right side front wheel shaft 13-1 and a right side rear wheel shaft 13-2 are respectively provided at the centers of a right side front wheel sprocket 14-1 and a right side rear wheel sprocket 14-2. A right side belt 15 is provided at the outer periphery of the right side front wheel sprocket 14-1 and the right side rear wheel sprocket 14-2, and a right side front wheel 3-1 (a driving wheel) and right side rear wheel 3-2 (a driven wheel) are coupled by the right side belt 15.

The right side front wheel 3-1 (the driving wheel) receives power of a right side electric motor 11 via a right side transmission 12, and rotates together with the right side front wheel shaft 13-1 and the right side front wheel sprocket 14-1 on the basis of the power. The right side rear wheel 3-2 (the driven wheel) receives rotational motion of the right side front wheel 3-1 (the driving wheel) from the right side belt 15, and rotates together with the right side rear wheel shaft 13-2 and the right side rear wheel sprocket 14-2 on the basis of the rotational motion.

For example, a transmission 12 includes a clutch and a gearbox. The gearbox is composed of a shaft 12A, one end of which is connected to an electric motor 11, and gears (not illustrated in the drawings) provided at the outer periphery of the shaft 12A, and transmits power of a power source (the electric motor 11) by varying torque, rotation frequency, and rotation direction. Therefore, a transmission 12, a front wheel shaft 13-1, a rear wheel shaft 13-2, a front wheel sprocket 14-1, a rear wheel sprocket 14-2, and a belt 15 are configured as a power transmission member.

The left and right electric motors 11 respectively drive the four wheels 3 by transmitting power to left and right power transmission members to perform traveling and stopping of the device main body 2. That is, the autonomous travel device 1 has a structure that causes the front wheels 3-1 (driving wheels) and the rear wheels 3-2 (driven wheels) at the same speed by using a single electric motor 11.

In this instance, a transmission 12 need not necessarily be included as a power transmission member. In this case, the electric motors 11 and the left and right front wheel shafts 13-1 are joined by gears (a fixed ratio), and rotation frequency and rotation direction of the electric motors 11 are controlled.

As illustrated in FIG. 2, the device main body 2 of the autonomous travel device 1 further includes a battery 30, an accommodation unit 40, a door 50, and a lock mechanism (not illustrated in the drawings).

An open hole is formed in the device main body 2 from the other end portion side of the device main body 2 up to a central portion of the device main body 2 within the device main body 2 as the accommodation unit 40. For example, in a case in which the one end portion side of the device main body 2 is defined as the front surface side (the front side) of the device main body 2, the other end portion side of the device main body 2 is a back surface side (a rear side) of the device main body 2. The accommodation unit 40 is a space for an operator to accommodate the battery 30 in a central portion of the device main body 2 within the device main body 2 from the back surface side (the rear side) of the device main body 2.

The door 50 is provided in order to cover the accommodation unit 40, and is provided in an open- and closable manner on the back surface side (rear side) of the device main body 2.

The lock mechanism is provided on the back surface side (rear side) of the device main body 2 in order to lock the door 50, which is closed, to the device main body 2. As the lock mechanism, it is sufficient as long as a mechanism that is capable of locking the door 50 to the device main body 2 is used, and the mechanism is not particularly limited.

Figure 3:
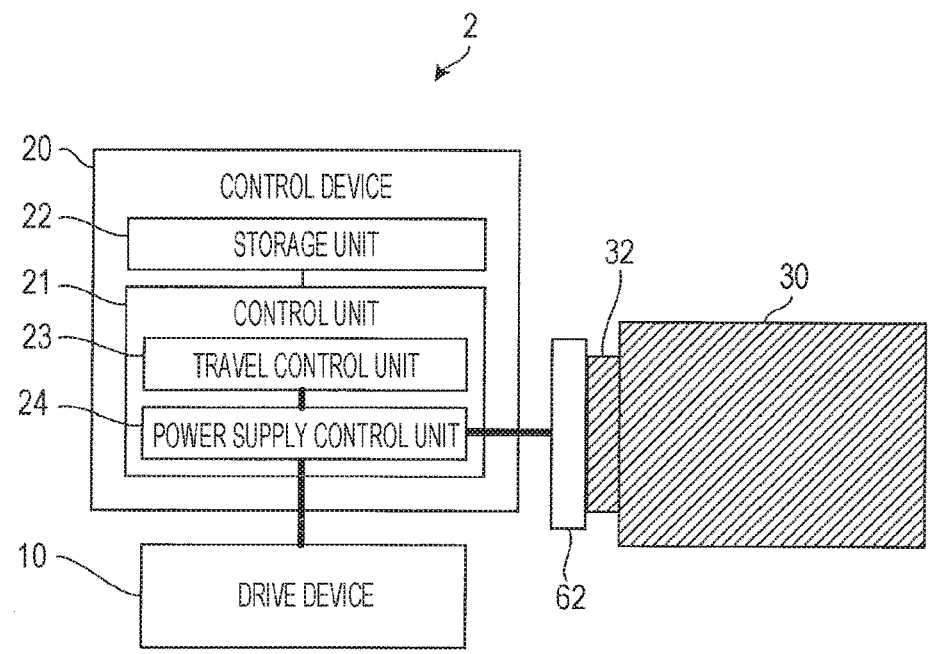
FIG. 3 is a block diagram that illustrates an electrical configuration of the autonomous travel device 1 according to the first embodiment.
Figure 4:
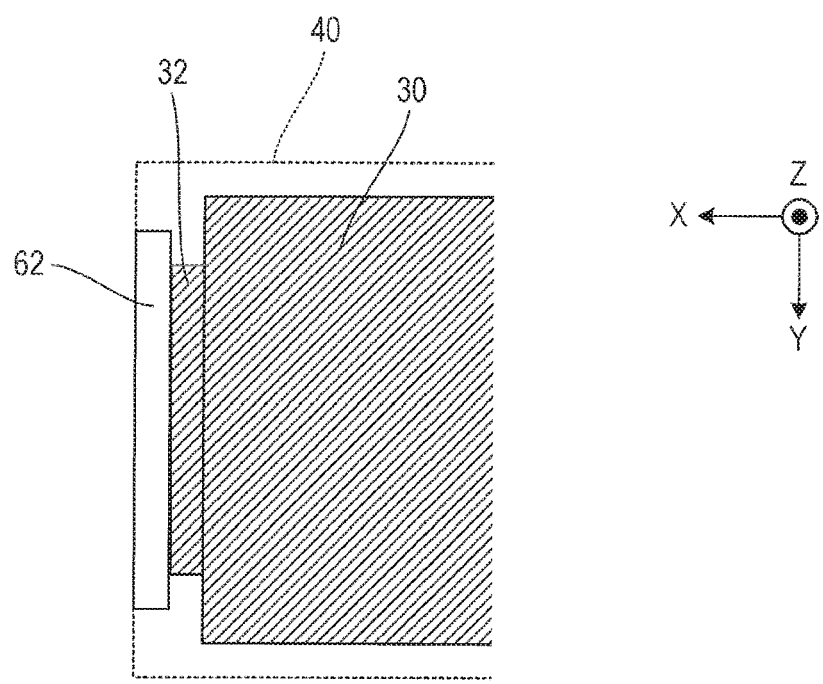
FIG. 4 is an enlarged view of a portion A of FIG. 2 in the autonomous travel device 1 according to the first embodiment.

FIG. 3 is a block diagram that illustrates an electrical configuration of the autonomous travel device 1 according to the first embodiment. FIG. 4 is an enlarged view of a portion A of FIG. 2.

As illustrated in FIG. 3, the device main body 2 of the autonomous travel device 1 further includes the control device 20, and a control device side electrode 62.

As illustrated in FIGS. 3 and 4, an electrode 32 is provided on the battery 30. The control device 20 is connected to the control device side electrode 62, which is provided on an inner wall portion of the accommodation unit 40 via wiring, which is not illustrated in the drawings. In a case in which the control device side electrode 62 is connected to the electrode 32 within the accommodation unit 40, power is supplied to the control device 20 from the battery 30. The control device 20 controls the drive device 10 by using power of the battery 30.

As illustrated in FIG. 3, the control device 20 is provided within the device main body 2, and includes a control unit 21, and a storage unit 22. The control unit 21 is a CPU (Central Processing Unit). A computer program that is executable by a computer is stored in the storage unit 22, and the control unit 21 reads and executes the computer program.

The control unit 21 includes a travel control unit 23. The travel control unit 23 controls the drive device 10 so as to drive the wheels 3. More specifically, the travel control unit 23 causes the device main body 2 to travel autonomously on a monitoring route, which is set in advance, at a set speed, which is set in advance, by controlling the drive device 10. That is, the autonomous travel device 1 travels autonomously by driving the wheels 3.

Since the autonomous travel device 1 has a structure in which the front wheels 3-1 (the driving wheels) and the rear wheels 3-2 (the driven wheels) are rotated at the same speed by a single electric motor 11, in a case in which the autonomous travel device 1 is caused to travel in a rectilinear manner, the travel control unit 23 controls the left and right electric motors 11 of the drive device 10 so that the left and right front wheels 3-1 (the driving wheels) rotate at the same rotation speed. In addition, in a case in which an advancement direction of the autonomous travel device 1 is varied, the travel control unit 23 controls the left and right electric motors 11 of the drive device 10 so as to cause a difference in rotation speeds of the left and right front wheels 3-1 (the driving wheels). Furthermore, in a case of turning the autonomous travel device 1, or causing so-called stationary rotation, the travel control unit 23 controls the left and right electric motors 11 of the drive device 10 so that the rotation directions of the left and right front wheels 3-1 (the driving wheels) become opposite.

The control unit 21 further includes a power supply control unit 24. In a case in which the control device side electrode 62 is connected to the electrode 32 of the battery 30 within the accommodation unit 40, the power supply control unit 24 supplies the power of the battery 30 to a power source (the left and right electric motors 11, or the like).

Figure 7:
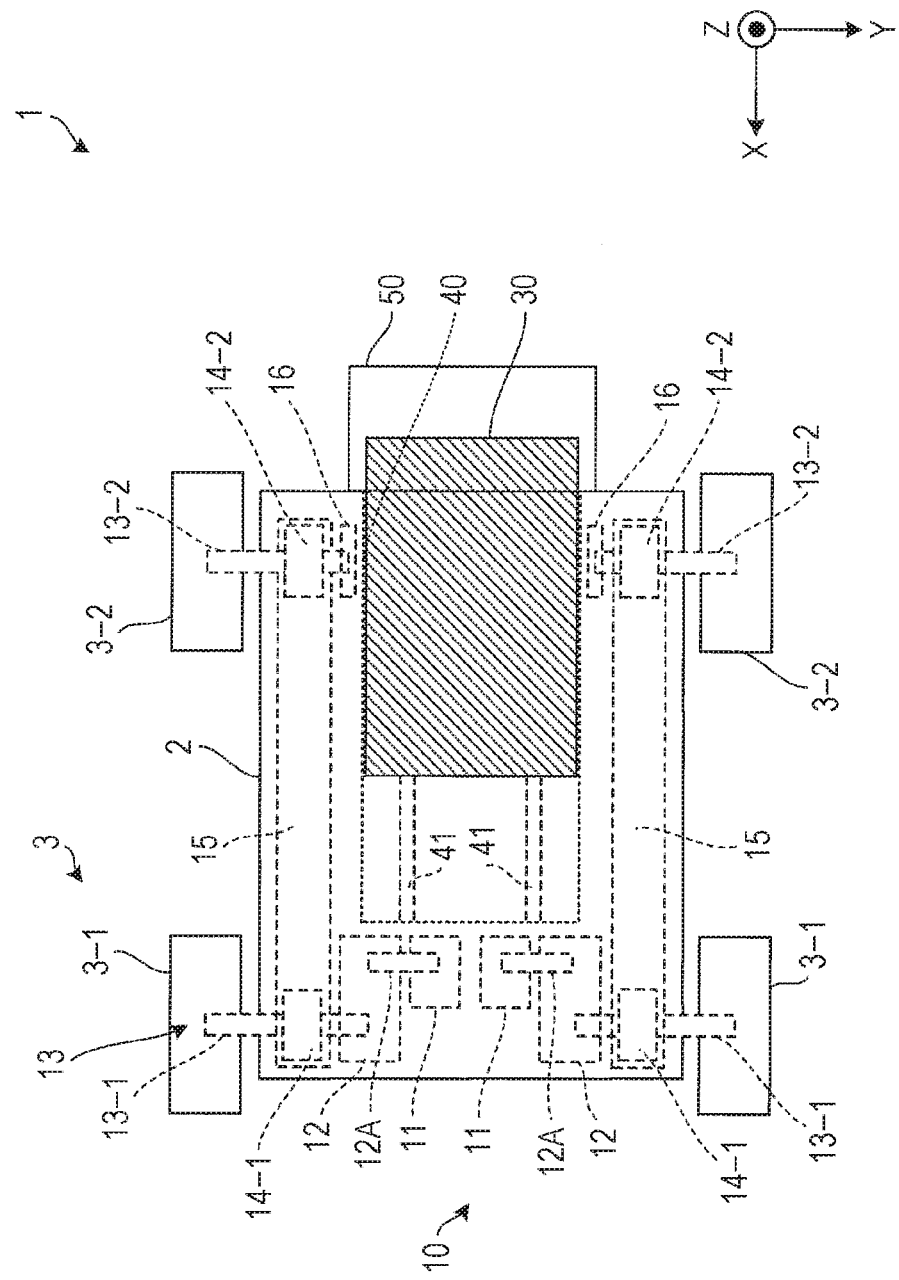
FIG. 7 illustrates an upper surface of the autonomous travel device 1 according to the first embodiment, and is a schematic view for describing an installation and removal operation of a battery 30 in the autonomous travel device 1 according to the first embodiment.

FIG. 5 is a cross-sectional view taken along line B-B' in FIG. 2. FIG. 6 is an enlarged view of a portion C of FIG. 5. FIG. 7 illustrates an upper surface of the autonomous travel device 1 according to the first embodiment, and is a schematic view for describing an installation and removal operation of the battery 30 in the autonomous travel device 1 according to the first embodiment.

As illustrated in FIG. 6, ribs 31 (protrusion portions), which are formed along a length direction (the X direction)

of a side surface of the battery 30, are provided on the bottom surface portion of the battery 30. As illustrated in FIGS. 2, 6, and 7, groove portions 41 (battery guide members), which are respectively formed in portions that correspond to left and right ribs 31 of the battery 30, are provided on the bottom surface (a floor surface) of the accommodation unit 40 within the device main body 2 so as to guide movement of the battery 30 in the X direction within the accommodation unit 40. That is, the groove portions 41 are rails for sliding the ribs 31 along.

Next, an installation and removal operation of the battery 30 in the autonomous travel device 1 according to the first embodiment will be described using FIGS. 2 to 7.

In a case in which an operator attaches the battery 30 within the device main body 2, firstly, the operator matches the orientation of the battery 30 so that the electrode 32 of the battery 30 faces the control device side electrode 62 within the accommodation unit 40 (refer to FIGS. 3 and 4). Next, as illustrated by FIGS. 5 to 7, the operator matches the ribs 31 of the battery 30 to the groove portions 41 of the accommodation unit 40. Next, as illustrated by FIGS. 7 and 2, the operator slides the battery 30 in the X direction from the other end portion (the back surface of the device main body 2) of the device main body 2 up to the central portion of the device main body 2 within the device main body 2. That is, as illustrated by FIG. 2, the operator accommodates the battery 30 within the device main body 2. In this case, as illustrated by FIGS. 3 and 4, the electrode 32 of the battery 30 is connected to the control device side electrode 62 within the accommodation unit 40. Next, as illustrated by FIG. 2, the operator closes the door 50. Lastly, the operator locks the door 50 by using a lock mechanism (not illustrated in the drawings) so that the door 50 does not open unexpectedly.

In a case in which an operator detaches the battery 30 from within the device main body 2, firstly, the operator releases the lock mechanism. Next, the operator opens the door 50. Next, as illustrated by FIGS. 2 and 7, the operator slides the battery 30 in a direction opposite the X direction from the central portion of the device main body 2 within the device main body 2 up to the other end portion (the back surface of the device main body 2) of the device main body 2. At this time, a connection of the control device side electrode 62 and the electrode 32 of the battery 30 within the accommodation unit 40 is released. Next, the operator detaches the battery 30 from the other end portion (the back surface of the device main body 2) of the device main body 2.

According to the above-mentioned explanation, the device main body 2, power sources (the left and right electric motors 11, or the like), which are provided on the one end portion side of the device main body 2 within the device main body 2 and cause the device main body 2 to travel autonomously by driving the wheels 3 (the front wheels 3-1 and the rear wheels 3-2), the battery 30 for supplying power to the power sources (the left and right electric motors 11, or the like), and the accommodation unit 40 for accommodating the battery 30 from the other end portion (the back surface of the device main body 2) of the device main body 2 to the central portion of the device main body 2 within the device main body 2 are provided in the autonomous travel device 1 according to the first embodiment.

In this manner, according to the autonomous travel device 1 according to the first embodiment, since the accommodation unit 40 is provided from the other end portion side (the back surface side of the device main body 2) of the device main body 2 up to the central portion of the device main body 2 within the device main body 2, it is possible to easily perform replacement of the battery 30 from the other end portion (the back surface of the device main body 2) of the device main body 2.

In addition, according to the autonomous travel device 1 according to the first embodiment, since the battery 30 is provided from the other end portion (the back surface of the device main body 2) of the device main body 2 to the central portion of the device main body 2 within the device main body 2, it is possible to perform autonomous travel that is stabilized due to disposition of the battery 30 in consideration of the center of gravity of the device main body 2 as a result of providing the power sources (the left and right electric motors 11, or the like) on the one end portion side of the device main body 2 within the device main body 2.

Accordingly, according to the autonomous travel device 1 according to the first embodiment, it is possible to easily perform replacement of the battery 30, and therefore, it is possible to perform autonomous travel that is stabilized due to disposition of the battery 30 in consideration of the center of gravity of the device main body 2.

In addition, in the autonomous travel device 1 according to the first embodiment, the protrusion portions (the ribs 31), which are formed along a length direction (the X direction) of the side surface of the battery 30, are provided on the battery 30. The battery guide members (the groove portions 41), which are formed in portions that correspond to the protrusion portions (the ribs 31) of the battery 30 are provided in the accommodation unit 40 so as to guide movement (movement in the X direction) of the battery 30 within the accommodation unit 40. The door 50, which is capable of opening and closing, for covering the accommodation unit 40 in which the battery 30 is accommodated is provided in the other end portion of the device main body 2.

In this manner, according to the autonomous travel device 1 according to the first embodiment, an operator can easily perform installation and removal of the battery 30 as replacement of the battery 30 by fitting the ribs 31 of the battery 30 to the groove portions 41 of the accommodation unit 40, and sliding the battery 30 in either the length direction (the X direction) of the side surface of the battery 30, or a direction opposite the length direction (the X direction) of the side surface of the battery 30.

Second Embodiment

Figure 8:
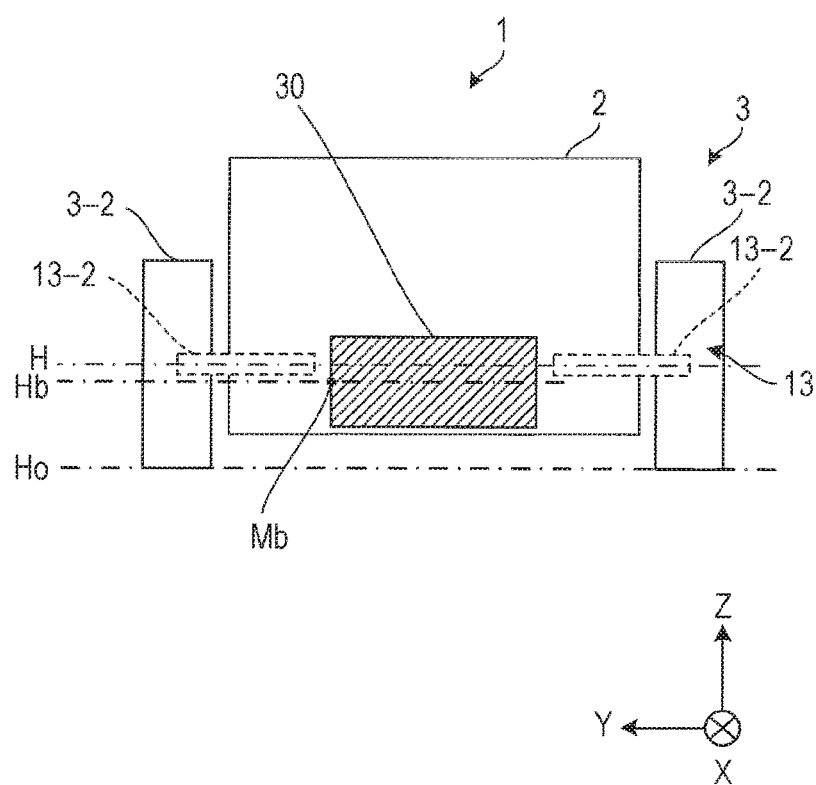
FIG. 8 is a cross-sectional view taken along line B-B' of FIG. 2 in an autonomous travel device 1 according to a second embodiment.

FIG. 8 is a cross-sectional view taken along line B-B' of FIG. 2 in an autonomous travel device 1 according to a second embodiment. In the second embodiment, altered features from the first embodiment will be described.

In the present embodiment, a ground contact surface of a wheel 3 (the rear wheels 3-2 in the case of FIG. 8) will be referred to as a ground contact surface Ho. In addition, a midpoint in the height (the height in the Z direction) of the battery 30 will be defined as a battery midpoint Mp, and a distance in the Z direction from the ground contact surface Ho up to the battery midpoint Mp will be referred to as a battery midpoint height Hb. In addition, a distance from the ground contact surface Ho up to an axis line of the axles 13 (the rear wheel shafts 13-2 in this case) of the wheels 3 (the rear wheels 3-2 in this case) will be referred to as an axle height H. In the present embodiment, the battery midpoint height Hb is set to be less than the axle height H.

According to the above-mentioned explanation, in the autonomous travel device 1 according to the second embodiment, the distance (the battery midpoint height Hb) from the ground contact surface Ho of the wheels 3 up to a midpoint Mb in the height of the battery 30 is less than the distance (the axle height H) from the ground contact surface Ho up to the axis line of the axles 13 of the wheels 3.

In this manner, according to the autonomous travel device 1 according to the second embodiment, since the center of gravity of the device main body 2 is set to be lower than that in the first embodiment, it is possible to perform autonomous travel that is more stabilized than that of the first embodiment.

Third Embodiment

FIG. 9 is an upper surface cross-sectional view of an autonomous travel device 1 according to a third embodiment. In the third embodiment, altered features from the first and second embodiments will be described.

In the present embodiment, a length of the side surface (the X direction) of the battery 30 is referred to as a battery side surface length Lb. In addition, a distance from an axis line of the axles 13 (the front wheel shafts 13-1) of the front wheels 3-1 of the wheels 3 up to the axis line of the axles 13 (the rear wheel shafts 13-2) of the rear wheels 3-2 of the wheels 3 is referred to as an inter-axis line distance L. In this case, the battery side surface length Lb is set to be greater than half (½L) the inter-axis line distance L.

According to the above-mentioned explanation, in the autonomous travel device 1 according to the third embodiment, the length (the battery side surface length Lb) of the side surface of the battery 30 is longer than half (½L) the distance (the inter-axis line distance L) from the axis line of the axles 13 (the front wheel shafts 13-1) of the front wheels 3-1 of the wheels 3 up to the axis line of the axles 13 (the rear wheel shafts 13-2) of the rear wheels 3-2 of the wheels 3.

In this manner, according to the autonomous travel device 1 according to the third embodiment, since the disposition of the battery 30 and the length (the battery side surface length Lb) of the side surface of the battery 30 are established in consideration of the center of gravity of the device main body 2, it is possible to perform autonomous travel that is more stabilized than those of the first and second embodiments.

Fourth Embodiment

FIG. 10 is a block diagram that illustrates an electrical configuration of an autonomous travel device 1 according to a fourth embodiment. FIG. 11 is a block diagram that illustrates an electrical configuration of the autonomous travel device 1 according to the fourth embodiment, and is a view for describing an opening and closing operation of the door 50 in the autonomous travel device 1 according to the fourth embodiment. In the fourth embodiment, altered features from the first to third embodiments will be described.

As illustrated in FIG. 10, the device main body 2 of the autonomous travel device 1 further includes an opening and closing detection unit 52. The opening and closing detection unit 52 detects opening and closing of the door 50, and outputs a detection result that represents the opening and closing to the control device 20. The opening and closing detection unit 52 is a contact type detection unit, detects that the door 50 is closed when in contact with the door 50, and detects that the door 50 is open when not in contact with the door 50. In addition, the opening and closing detection unit 52 is not limited to the above-mentioned contact type detection unit, and may be a non-contact type that uses a magnet, infrared rays, or the like.

As illustrated in FIG. 10, the control unit 21 of the control device 20 within the device main body 2 of the autonomous travel device 1 further includes an opening and closing control unit 25. The opening and closing control unit 25 allows the power supply control unit 24 to supply power to the power sources (the left and right electric motors 11, or the like) from the battery 30 in a case in which the detection result output from the opening and closing sensor 52 represents the door 50 being closed.

Next, an opening and closing operation of the door 50 in the autonomous travel device 1 according to the fourth embodiment will be described using FIGS. 10 and 11.

In a case in which the door 50 is closed, the opening and closing detection unit 52 is in contact with the door 50. In this case, the opening and closing detection unit 52 detects that the door 50 is closed, and outputs a closed state detection result to the control device 20 as a detection result that represents the fact that the door 50 is closed. The opening and closing control unit 25 of the control device 20 outputs a power supply allowed signal, which represents the fact that power supply to the power sources (the left and right electric motors 11, or the like) from the battery 30 is allowed, to the power supply control unit 24 in accordance with the closed state detection result. As illustrated in FIG. 11, in a case in which the control device side electrode 62 is connected to the electrode 32 of the battery 30 within the accommodation unit 40, the power supply control unit 24 supplies the power of the battery 30 to the power sources (the left and right electric motors 11, or the like) in accordance with the power supply allowed signal.

In a case in which the door 50 is not closed, the opening and closing detection unit 52 is not in contact with the door 50. In this case, the opening and closing detection unit 52 detects that the door 50 is open, and outputs an open state detection result to the control device 20 as a detection result that represents the fact that the door 50 is open. The opening and closing control unit 25 of the control device 20 outputs a power supply prohibited signal, which represents the fact that power supply to the power sources (the left and right electric motors 11, or the like) from the battery 30 is prohibited, to the power supply control unit 24 in accordance with the open state detection result. In this case, even if the control device side electrode 62 is connected to the electrode 32 of the battery 30 within the accommodation unit 40, since the door 50 is open, the power supply control unit 24 does not supply the power of the battery 30 to the power sources (the left and right electric motors 11, or the like) in accordance with the power supply prohibited signal.

According to the above-mentioned explanation, the opening and closing detection unit 52, which detects opening and closing of the door 50, and the control device 20 (the power supply control unit 24 and the opening and closing control unit 25 in this case), which supplies the power of the battery 30 to the power sources (the electric motors 11, or the like) in a case in which the door 50 being closed is the detection result, are included in the autonomous travel device 1 according to the fourth embodiment.

In this manner, according to the autonomous travel device 1 according to the fourth embodiment, when an operator attaches the battery 30 within the device main body 2 as replacement of the battery 30 by the operator, the control device 20 (the power supply control unit 24 and the opening and closing control unit 25 in this case) do not supply the power of the battery 30 to the power sources (the electric motors 11, or the like) in a case in which the door 50 is not closed. Therefore, it is possible to prevent a phenomenon in which the battery 30 drops out from the device main body 2, and a phenomenon that could lead to the generation of sparks between the electrode 32 of the battery 30 and the control device side electrode 62 within the accommodation unit 40, which arise as a result of door 50 not being closed. Accordingly, safety is improved.

Fifth Embodiment

Figure 13:
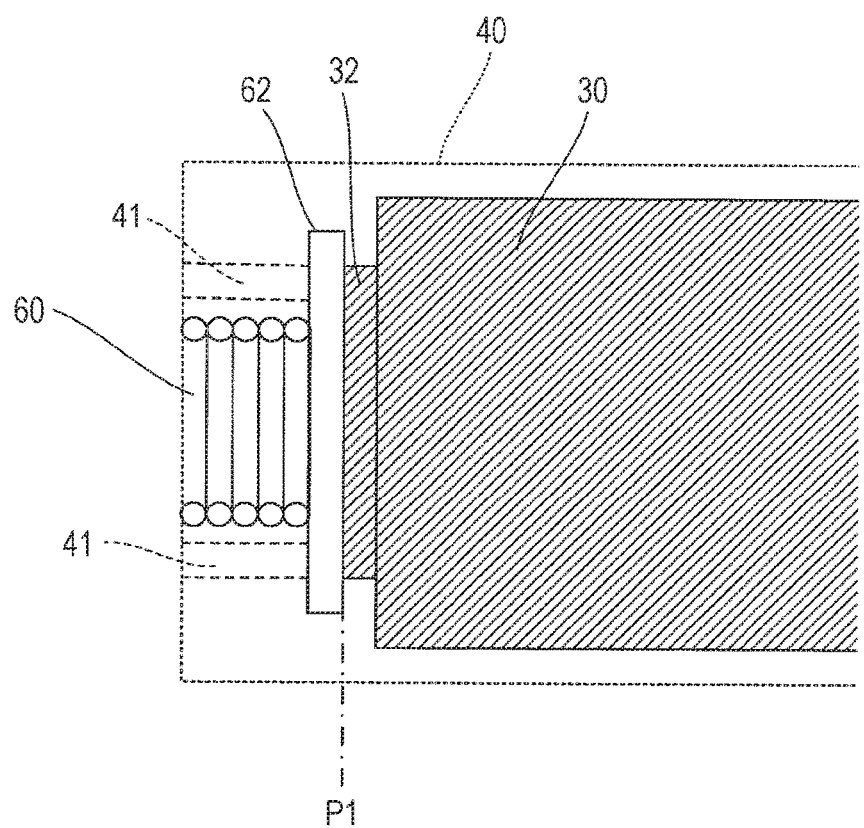
FIG. 13 is an enlarged view of a portion D of FIG. 12 in the autonomous travel device 1 according to the fifth embodiment.
Figure 14:
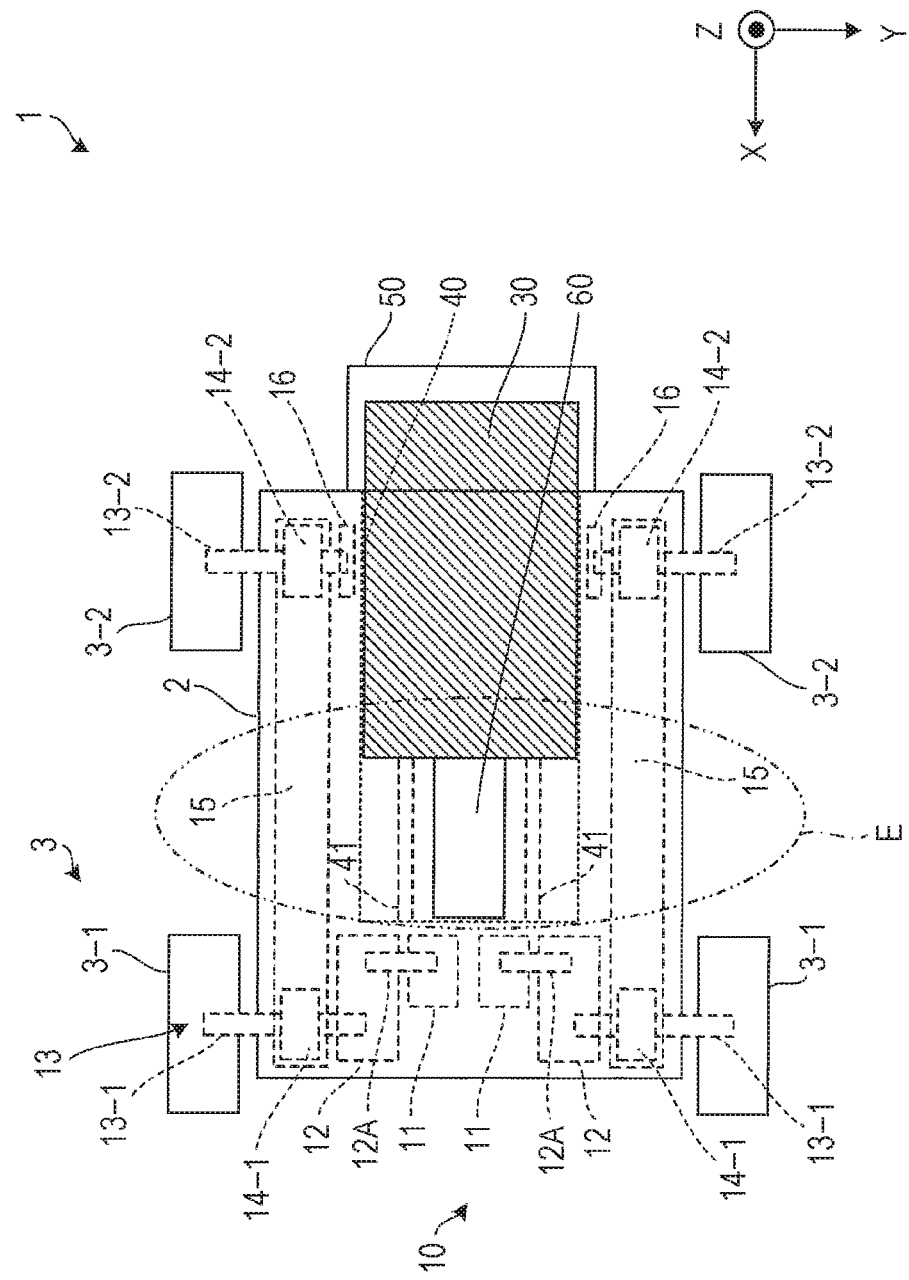
FIG. 14 is an upper surface cross-sectional view of the autonomous travel device 1 according to the fifth embodiment, and is a view for describing an installation and removal operation of a battery 30 in the autonomous travel device 1 according to the fifth embodiment.
Figure 15:
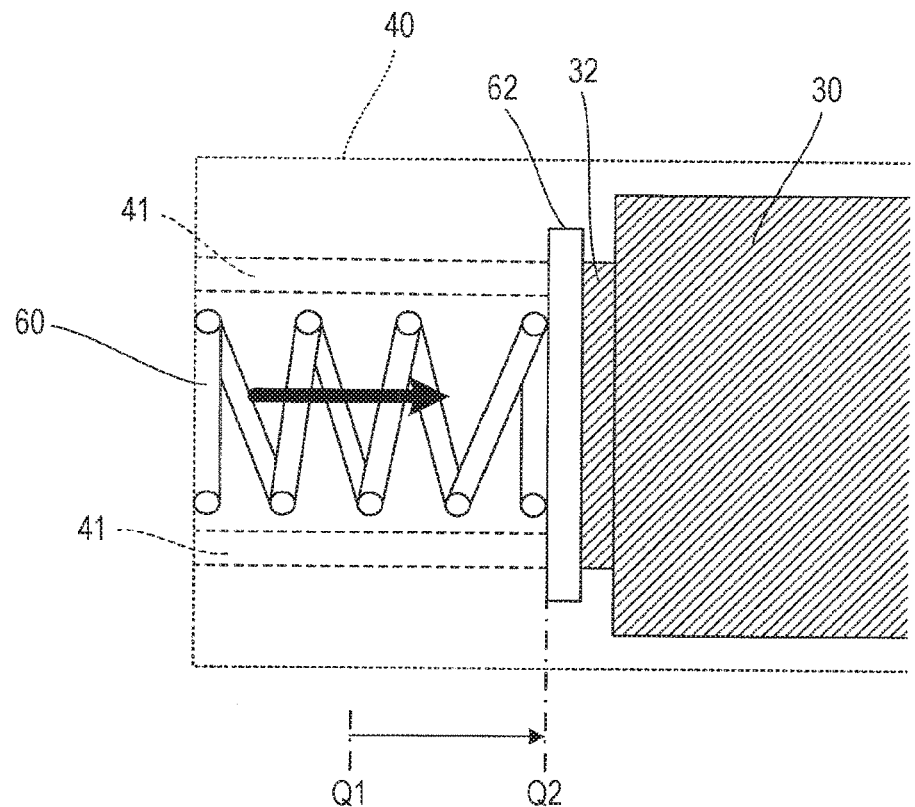
FIG. 15 is an enlarged view of a portion E of FIG. 14 in the autonomous travel device 1 according to the fifth embodiment.

FIG. 12 is an upper surface cross-sectional view of an autonomous travel device 1 according to a fifth embodiment. FIG. 13 is an enlarged view of a portion D of FIG. 12. FIG. 14 is an upper surface cross-sectional view of the autonomous travel device 1 according to the fifth embodiment, and is a view for describing an installation and removal operation of a battery 30 in the autonomous travel device 1 according to the fifth embodiment. FIG. 15 is an enlarged view of a portion E of FIG. 14. In the fifth embodiment, altered features from the first to fourth embodiments will be described.

As illustrated in FIGS. 12 to 15, the device main body 2 of the autonomous travel device 1 further includes a spring 60 (a battery movement unit). As illustrated in FIGS. 13 and 15, the spring 60 is provided between the inner wall portion of the accommodation unit 40 and the control device side electrode 62. The spring 60 is formed by using a conductive material.

Next, an installation and removal operation of the battery 30 in the autonomous travel device 1 according to the fifth embodiment will be described using FIGS. 12 to 15.

In a case in which an operator attaches the battery 30 within the device main body 2, firstly, the operator matches the orientation of the battery 30 so that the electrode 32 of the battery 30 faces the control device side electrode 62 within the accommodation unit 40. Next, as illustrated by FIG. 14, the operator matches the ribs 31 of the battery 30 to the groove portions 41 of the accommodation unit 40. Next, as illustrated by FIGS. 14 and 12, the operator slides the battery 30 in the X direction from the other end portion (the back surface of the device main body 2) of the device main body 2 up to the central portion of the device main body 2 within the device main body 2. That is, as illustrated by FIG. 12, the operator accommodates the battery 30 within the device main body 2. In this case, as illustrated by FIG. 13, the spring 60 is compressed within the accommodation unit 40 by the electrode 32 of the battery 30 being connected to the control device side electrode 62 within the accommodation unit 40 and the battery 30 being pushed in the X direction. At this time, one end portion (the electrode 32) of the battery 30 is disposed in a power supply position Q1. The power supply position Q1 is a position for supplying power to the power sources (the electric motors 11) from the battery 30. Next, as illustrated by FIG. 12, the operator closes the door 50. Lastly, the operator locks the door 50 by using the lock mechanism (not illustrated in the drawings) so that the door 50 does not open due to a biasing force of the spring 60.

In a case in which an operator detaches the battery 30 from within the device main body 2, firstly, the operator releases the lock mechanism. Next, the operator opens the door 50. When the door 50 is opened, as illustrated by FIG. 15, the battery 30 is pushed in a direction opposite the X direction by the biasing force of the spring 60, and the spring 60 extends within the accommodation unit 40. In this case, as illustrated by FIGS. 12 and 14, the battery 30 Slides in a direction opposite the X direction from the central portion of the device main body 2 within the device main body 2 up to the other end portion (the back surface of the device main body 2) of the device main body 2. At this time, the one end portion (the electrode 32) of the battery 30 moves from the power supply position Q1 to a take-out position Q2. The take-out position Q2 is a position for taking the battery 30 out from the device main body 2. Next, the operator detaches the battery 30 from the other end portion (the back surface of the device main body 2) of the device main body 2 in order to release the connection of the control device side electrode 62 and the electrode 32 of the battery 30 within the accommodation unit 40.

According to the above-mentioned explanation, the battery movement unit (the spring 60), which moves the battery 30 from the power supply position Q1 for supplying power to the power sources (the electric motors 11) from the battery 30 to the take-out position Q2 for taking the battery 30 out from the device main body 2 when the door 50 is opened, is further provided in the autonomous travel device 1 according to the fifth embodiment.

In this manner, according to the autonomous travel device 1 according to the fifth embodiment, when an operator opens the door 50 in order to take the battery 30 out from the device main body 2 as replacement of the battery 30 by the operator, the battery 30 moves from the power supply position Q1 to the take-out position Q2. Therefore, by opening the door 50, it is possible for an operator to easily take the battery 30 out from the device main body 2. Accordingly, convenience is improved.

In the autonomous travel devices 1 according to the first to fifth embodiments, the wheels 3 have a four wheel configuration that includes the left and right front wheels 3-1 and the left and right rear wheels 3-2, but the invention is not limited to this configuration. In the autonomous travel devices 1 according to the first to fifth embodiments, as long as it is possible to realize the above-mentioned effects, the wheels 3 may have a three-wheel configuration.

In a case in which the wheels 3 have a three-wheel configuration, the wheels 3 may include a single front wheel 3-1 and the left and right rear wheels 3-2. Only a single electric motor 11, transmission 12, shaft 12A, and front wheel shaft 13-1 are necessary, and the front wheel sprocket 14-1, the rear wheel sprocket 14-2, and the left and right belts 15 are unnecessary. In this instance, the width of the single front wheel 3-1 may be greater than the width of the left and right rear wheels 3-2. Alternatively, the shape of the device main body 2 may form a tapered shape toward the one end portion (the front surface of the device main body 2) of the device main body 2 from the other end portion (the back surface of the device main body 2) of the device main body 2 when viewed from above the device main body 2; that is, toward the X direction.

In addition, in the autonomous travel devices 1 according to the first to fifth embodiments, there is a single battery 30, but the invention is not limited to this configuration, and as long as it is possible to realize the above-mentioned effects, there may be two batteries 30. In a case in which there are two batteries 30, it is preferable that a tray that is capable of accommodating the two batteries 30 at the same time be provided. In addition, in the autonomous travel devices 1 according to the first to fifth embodiments, there are left and right belts 15, but as long as it is possible to realize the above-mentioned effects, the front wheel sprocket 14-1, the rear wheel sprocket 14-2, and the left and right belts 15 need not necessarily be provided. Such configurations will be presented below as an application example.

Application Example

Figure 16:
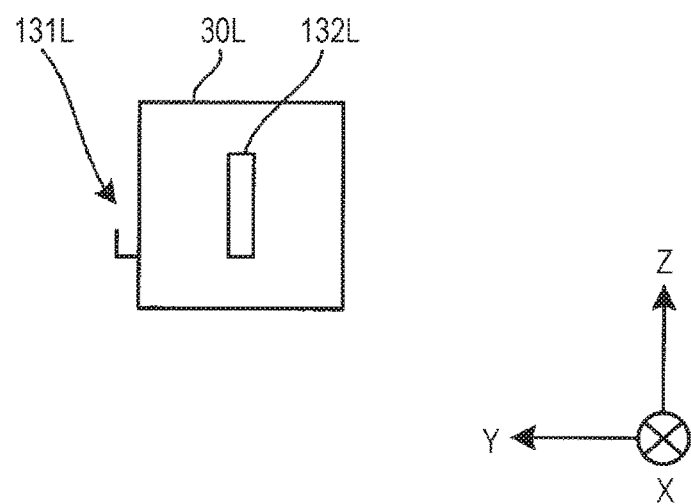
FIG. 16 is a front view of a battery 30L in an autonomous travel device 1 according to an application example.
Figure 17:
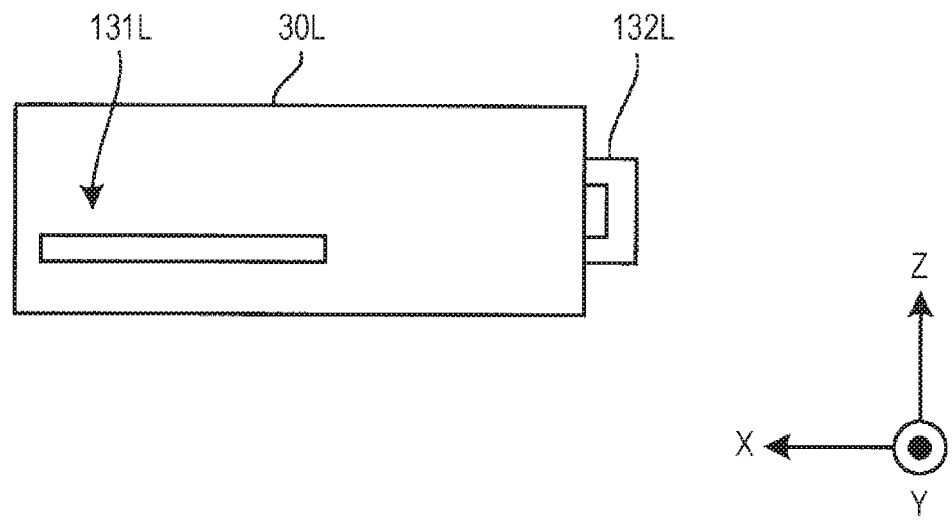
FIG. 17 is a left side surface view of the battery 30L in the autonomous travel device 1 according to the application example.
Figure 18:
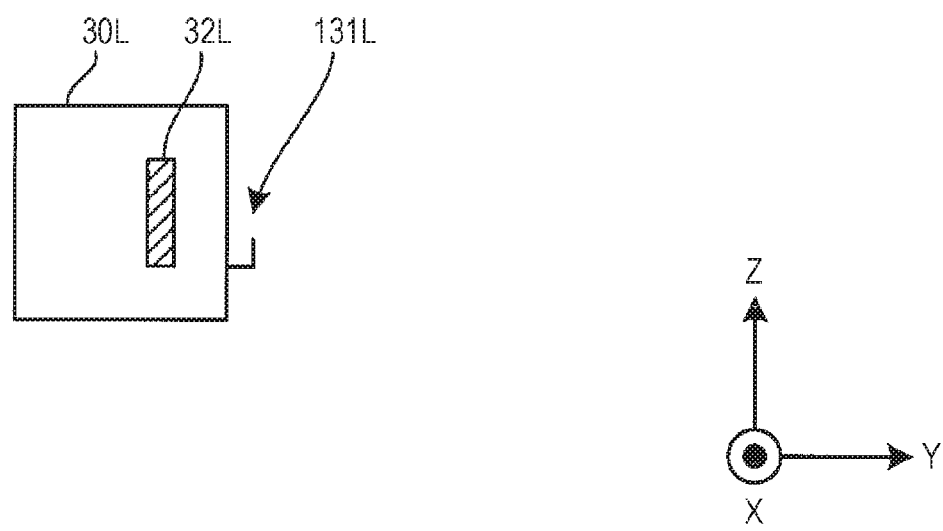
FIG. 18 is a rear view of the battery 30L in the autonomous travel device 1 according to the application example.
Figure 21:
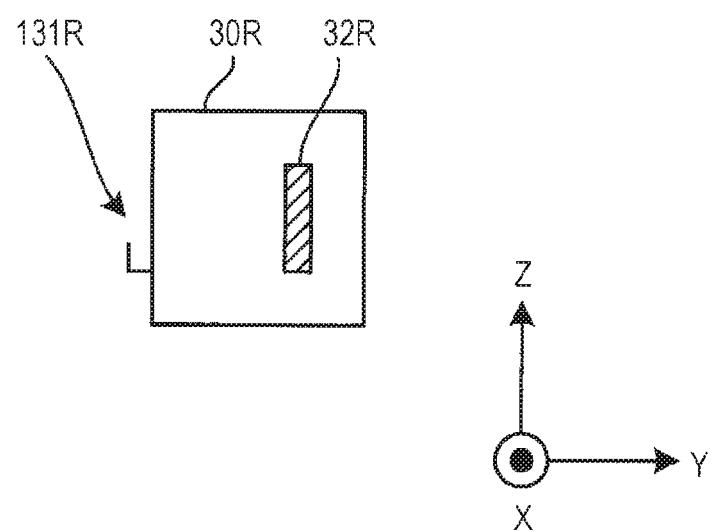
FIG. 21 is a rear view of the battery 30R in the autonomous travel device 1 according to the application example.
Figure 22:
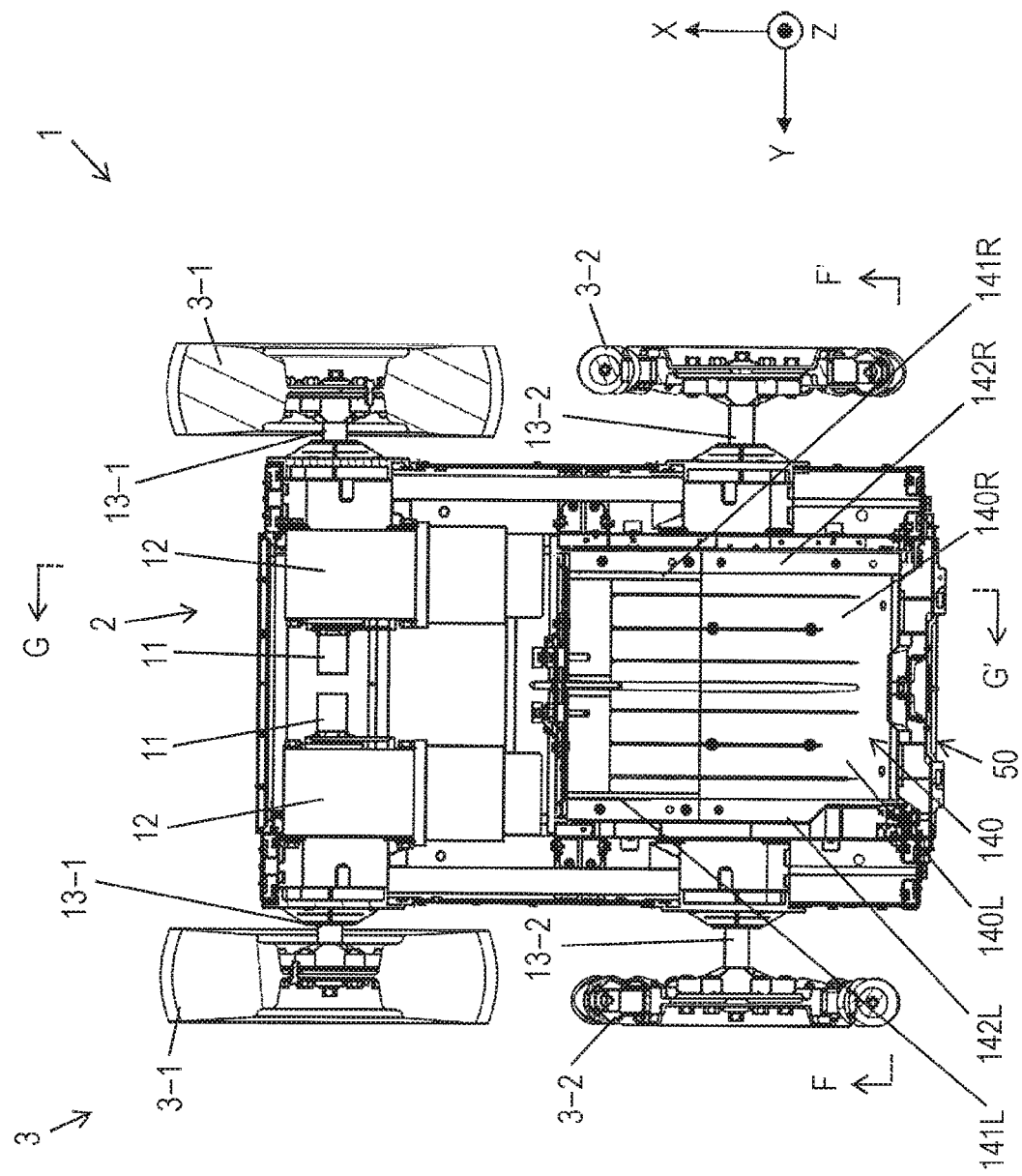
FIG. 22 is an upper surface cross-sectional view of the autonomous travel device 1 according to the application example.
Figure 23:
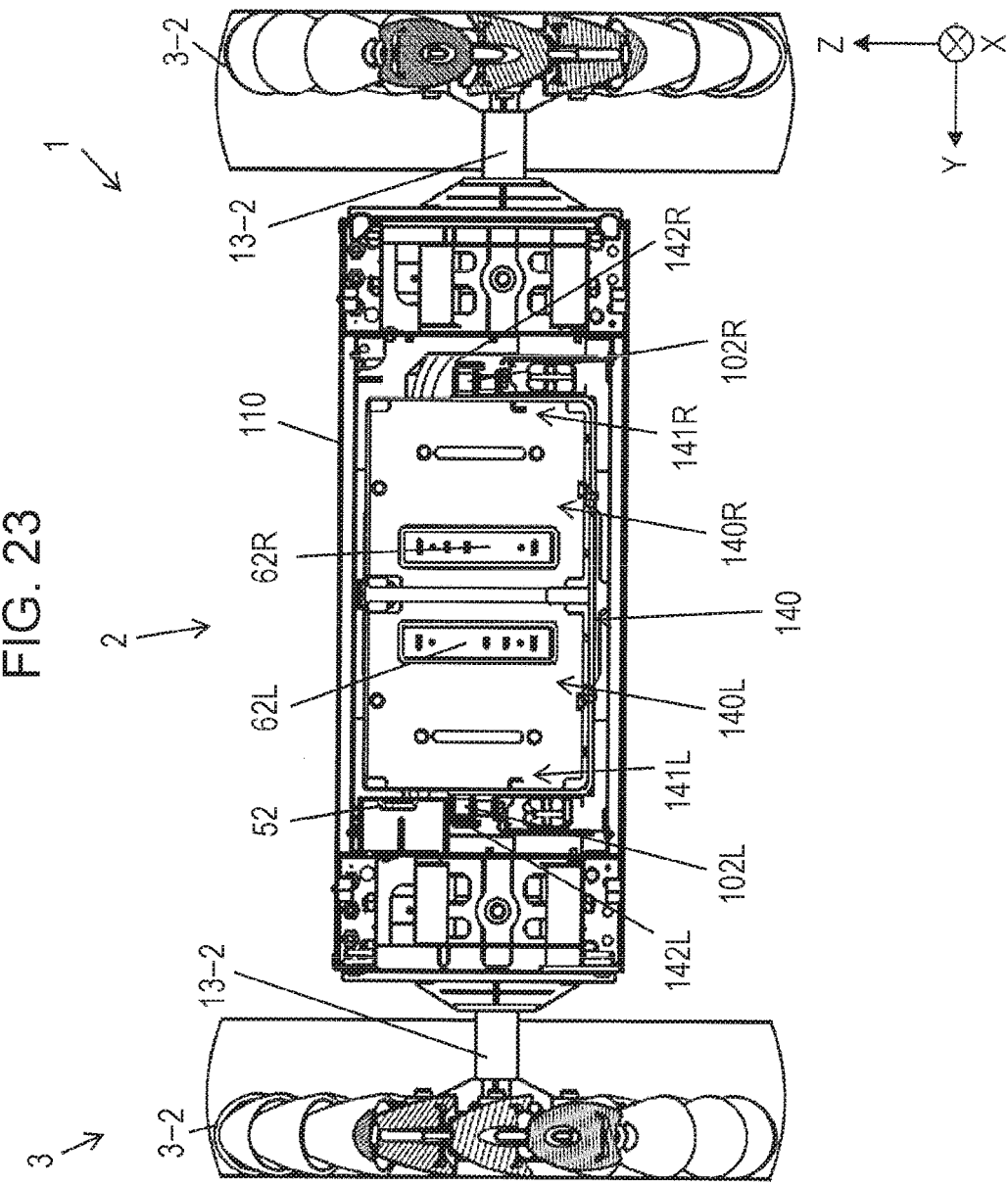
FIG. 23 is a cross-sectional view taken along line F-F' of FIG. 22 in the autonomous travel device 1 according to the application example.
Figure 24:
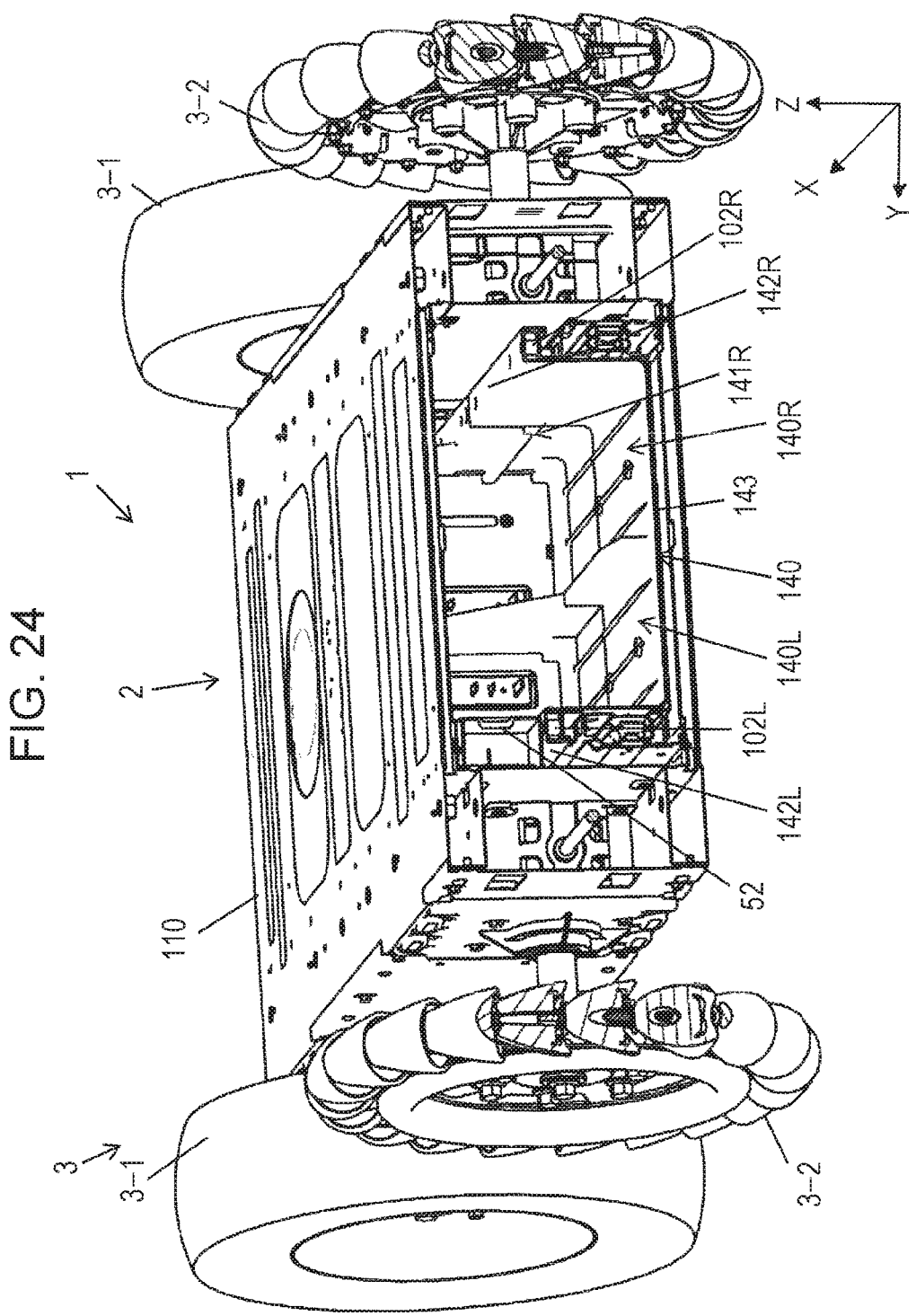
FIG. 24 is a perspective cross-sectional view taken along line F-F' of FIG. 22 in the autonomous travel device 1 according to the application example.
Figure 25:
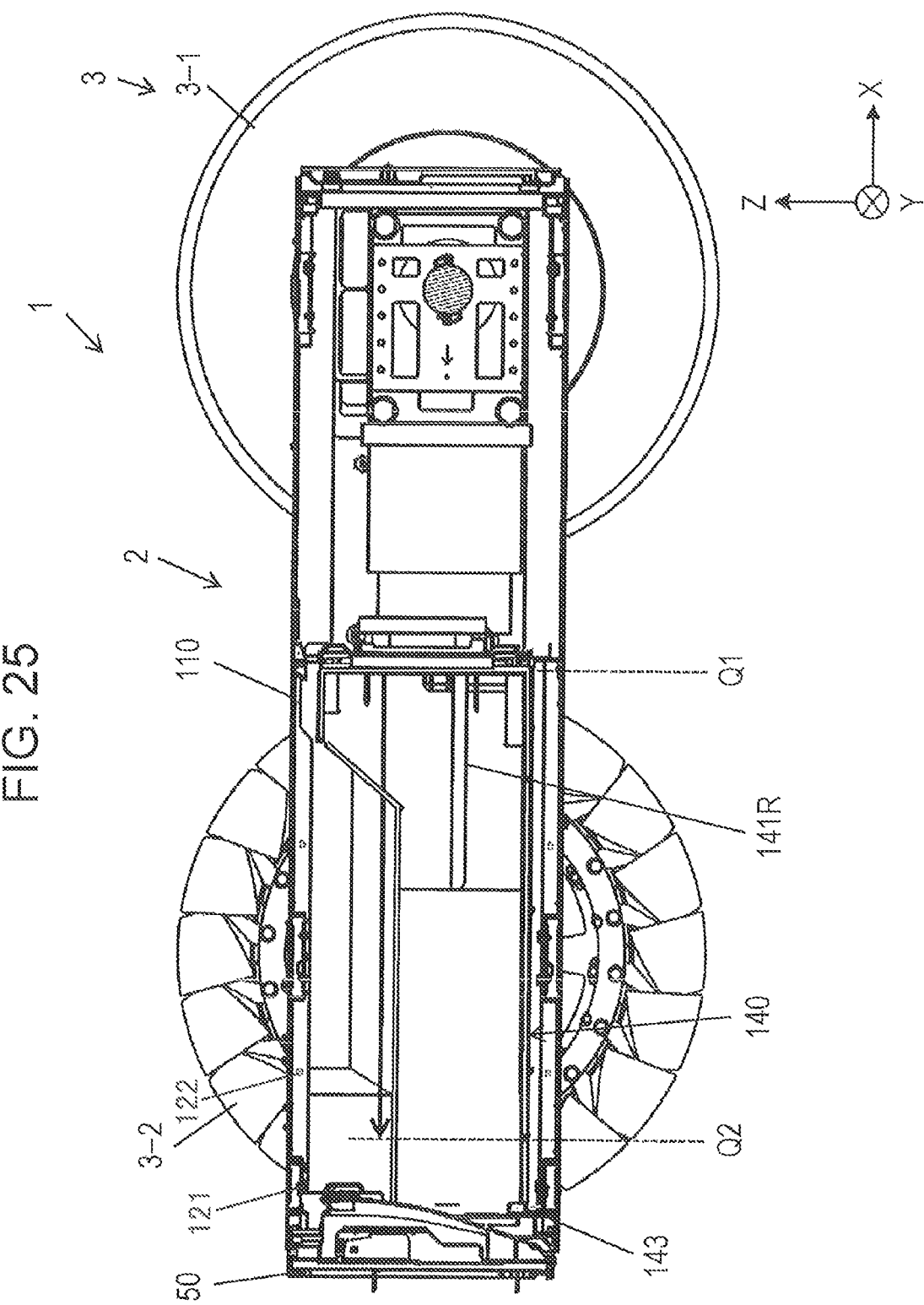
FIG. 25 is a cross-sectional view taken along line G-G' of FIG. 22 in the autonomous travel device 1 according to the application example.

FIGS. 16 to 18 are respectively a front view, a left side surface view, and a rear view of a battery 30L in an autonomous travel device 1 according to an application example. FIGS. 19 to 21 are respectively a front view, a left side surface view, and a rear view of a battery 30R in the autonomous travel device 1 according to the application example. FIG. 22 is an upper surface cross-sectional view of the autonomous travel device 1 according to the application example. FIG. 23 is a cross-sectional view taken along line F-F' in FIG. 22. FIG. 24 is a perspective cross-sectional view taken along line F-F' in FIG. 22. FIG. 25 is a cross-sectional view taken along line G-G' in FIG. 22.

In a case in which there are two batteries 30, as illustrated by FIGS. 16 to 21, the two batteries 30 are defined as batteries 30L and 30R. Protrusion portions (rails 131L and 131R), which are formed along the length direction (the X direction) of the side surfaces of the batteries 30L and 30R, are respectively provided on the side surface portions of the batteries 30L and 30R.

More specifically, as illustrated by FIGS. 16 to 18, the rail 131L is provided on a left side surface portion of the battery 30L as a protrusion portion formed along the length direction (the X direction) of the side surface of the battery 30L. As illustrated in FIGS. 19 to 21, the rail 131R is provided on a right side surface portion of the battery 30R as a protrusion portion formed along the length direction (the X direction) of the side surface of the battery 30R.

As illustrated in FIGS. 16 to 18, a handle 132L is provided on the front surface of the battery 30L. As illustrated in FIGS. 19 to 21, a handle 132R is provided on the front surface of the battery 30R.

As illustrated in FIGS. 16 to 18, an electrode 32L is provided on the back surface of the battery 30L as the above-mentioned electrode 32. The electrode 32L is connected to a control device side electrode 62L (FIGS. 23 and 24) as the above-mentioned control device side electrode 62 when the battery 30L is accommodated in the accommodation unit 40 (FIGS. 2, 7, and 9). Alternatively, the electrode 32L is connected to the control device side electrode 62L (FIGS. 23 and 24) when the door 50 (FIGS. 22 and 25) is closed after the battery 30L is accommodated in the accommodation unit 40 (FIGS. 2, 7, and 9).

As illustrated in FIGS. 19 to 21, an electrode 32R is provided on the back surface of the battery 30R as the above-mentioned electrode 32. The electrode 32R is connected to a control device side electrode 62R (FIGS. 23 and 24) as the above-mentioned control device side electrode 62 when the battery 30R is accommodated in the accommodation unit 40 (FIGS. 2, 7, and 9). Alternatively, the electrode 32L is connected to the control device side electrode 62R (FIGS. 23 and 24) when the door 50 (FIGS. 22 and 25) is closed after the battery 30L is accommodated in the accommodation unit 40 (FIGS. 2, 7, and 9).

The door 50 (FIGS. 22 and 25) is provided in the other end portion of the device main body 2 in the same manner as that in the first to fifth embodiments.

As illustrated in FIGS. 22 to 25, a tray 140 is provided in the accommodation unit 40 (FIGS. 2, 7, and 9). As illustrated in FIGS. 22 to 24, the tray 140 is configured by a bottom surface portion and wall portion, which is a side surface portion, and has accommodation regions 140L, 140R for respectively accommodating the batteries 30L and 30R (FIGS. 16 to 21).

In this instance, in the same manner as that of the fourth embodiment, the opening and closing detection unit 52 (FIGS. 23 and 24) detects opening and closing of the door 50 (FIGS. 22 and 25), and the control device 20 (FIGS. 10 and 11) supplies power of the batteries 30L and 30R (FIGS. 16 to 21) respectively accommodated in the accommodation regions 140L, 140R to the power sources (the electric motors 11 (FIGS. 2, 7, and 9)) in a case in which the door 50 (FIGS. 22 and 25) being closed is the detection result.

As illustrated in FIGS. 22 to 24, protrusion portions (rails 142L and 142R), which are formed along the length direction (the X direction) of the side surface of the tray 140, are provided on the outer wall portions of the tray 140. More specifically, the rail 142L is provided on the outer wall portion of the accommodation region 140L of the tray 140 as a protrusion portion formed along the length direction (the X direction) of the side surface of the tray 140. The rail 142R is provided on the outer wall portion of the accommodation region 140R of the tray 140 as a protrusion portion formed along the length direction (the X direction) of the side surface of the tray 140.

As illustrated in FIGS. 23 and 24, tray guide members (tray guide rails 102L and 102R), which are formed in portions that correspond to the protrusion portions (the rails 142L and 142R) of the tray 140, are provided on the inner wall portions of the accommodation unit 40 (FIGS. 2, 7, and 9) so as to guide movement of the tray 140 within the accommodation unit (FIGS. 2, 7, and 9).

The protrusion portions (the rails 142L and 142R) and the tray guide members (tray guide rails 102L and 102R) configure slide rails. As a result of the slide rails, as illustrated by FIG. 25, the tray 140 is capable of sliding from the power supply position Q1 for supplying power to the power sources (the electric motors 11 (FIGS. 2, 7, and 9)) from the batteries 30L and 30R (FIGS. 16 to 21) to the take-out position Q2 for taking the batteries 30L and 30R (FIGS. 16 to 21) out from the device main body 2. The take-out position Q2 is set by using stoppers (not illustrated in the drawings) of the tray guide members (the tray guide rails 102L and 102R) of FIGS. 23 and 24.

As illustrated in FIGS. 22 to 25, battery guide rails 141L, 141R are provided on the inner wall portions of the tray 140 as battery guide members formed in portions that correspond to the protrusion portions (the rails 131L and 131R (FIGS. 16 to 21)) of the batteries 30L and 30R (FIGS. 16 to 21) in order to guide movement of the batteries 30L and 30R (FIGS. 16 to 21) within the tray 140.

More specifically, as illustrated by FIGS. 22 and 23, the battery guide rail 141L is provided on the inner wall portion of the accommodation region 140L of the tray 140 as a battery guide member formed in a portion that corresponds to the protrusion portion (the rail 131L) of the battery 30L of FIGS. 16 to 18 in order to guide movement of the battery 30L (FIGS. 16 to 18) within the tray 140.

As illustrated in FIGS. 22 to 25, the battery guide rail 141R is provided on the inner wall portion of the accommodation region 140R of the tray 140 as a battery guide member formed in a portion that corresponds to the protrusion portion (the rail 131R) of the battery 30R of FIGS. 19 to 21 in order to guide movement of the battery 30R (FIGS. 19 to 21) within the tray 140.

As illustrated in FIGS. 24 and 25, mountain portions 143 are provided in an end portion on the door 50 (FIG. 25) side of the tray 140 as stopper portions. The stopper portions (the mountain portions 143) prevent the batteries 30L and 30R (FIGS. 16 to 21) from dropping out from the tray 140 when an operator draws out the tray 140 and the batteries 30L and 30R (FIGS. 16 to 21) by pulling the handles (the handle 132 of FIGS. 16 and 17 and the handle L132R of FIGS. 19 and 20) of the batteries 30L and 30R (FIGS. 16 to 21) while the door 50 (FIG. 25) is open.

As illustrated in FIGS. 23 to 25, a top plate 110 is provided on the device main body 2 as an upper surface portion. The top plate 110 prevents the batteries 30L and 30R (FIGS. 16 to 21) and the tray 140 from being raised upward to a predetermined height when an operator draws the batteries 30L and 30R (FIGS. 16 to 21) out from the tray 140 riding over the stopper portions (the mountain portions 143).

In this instance, as illustrated by FIG. 25, reinforcing materials 111 and 112, which reinforce the top plate 110, may be provided on the top plate 110. As attachment locations of the reinforcing materials 111 and 112, for example, the reinforcing material 111 is provided in the end portion on the door 50 side of a rear surface (a surface that faces the bottom surface of the tray 140) of the top plate 110. The reinforcing material 112 is provided in a central section of the rear surface of the top plate 110.

As illustrated in FIG. 25, cushioning materials 121, 122 are provided in the vicinity of the end portion on the door 50 side of the top plate 110. The cushioning materials 121, 122 cushion an impact of the batteries 30L and 30R (FIGS. 16 to 21) against the top plate 110 when an operator draws the batteries 30L and 30R (FIGS. 16 to 21) out from the tray 140 riding over the stopper portions (the mountain portions 143).

As attachment locations of the cushioning materials 121, 122, for example, as illustrated by FIG. 25, the cushioning material 121 is provided on the reinforcing material 111 on the rear surface (the surface that faces the bottom surface of the tray 140) of the top plate 110. The cushioning material 122 is provided between the reinforcing material 111 and the reinforcing material 112 on the rear surface (the surface that faces the bottom surface of the tray 140) of the top plate 110.

Ethylene-propylene-diene rubber (EPDM), or the like, can be used as the material of the cushioning materials 121, 122.

According to the above-mentioned explanation, in the autonomous travel device 1 according to the application example, it is possible to easily perform replacement of the batteries 30L and 30R, and therefore, it is possible to perform autonomous travel that is stabilized due to disposition of the batteries 30L and 30R in consideration of the center of gravity of the device main body 2.

In the above-mentioned manner, the present invention is not limited to the above-mentioned embodiments, and various alterations are possible. That is, embodiments obtained by combining technical means that have been changed as appropriate are also included in the technical scope of the present invention.

REFERENCE SIGNS LIST

1 AUTONOMOUS TRAVEL DEVICE
2 DEVICE MAIN BODY
3 WHEEL
3-1 FRONT WHEEL
3-2 REAR WHEEL
10 DRIVE DEVICE
11 ELECTRIC MOTOR (POWER SOURCE)
12 TRANSMISSION
12A SHAFT
13 AXLE
13-1 FRONT WHEEL SHAFT
13-2 REAR WHEEL SHAFT
14-1 FRONT WHEEL SPROCKET
14-2 REAR WHEEL SPROCKET
15 BELT
16 BEARING
20 CONTROL DEVICE
21 CONTROL UNIT
22 STORAGE UNIT
23 TRAVEL CONTROL UNIT
24 POWER SUPPLY CONTROL UNIT
25 OPENING AND CLOSING CONTROL UNIT
30 BATTERY
30L BATTERY
30R BATTERY
31 RIB (PROTRUSION PORTION)
32 ELECTRODE
32L ELECTRODE
32R ELECTRODE
40 ACCOMMODATION UNIT
41 GROOVE PORTION (BATTERY GUIDE MEMBER)
50 DOOR
52 OPENING AND CLOSING DETECTION UNIT
60 SPRING (BATTERY MOVEMENT UNIT)
62 CONTROL DEVICE SIDE ELECTRODE
62L CONTROL DEVICE SIDE ELECTRODE
62R CONTROL DEVICE SIDE ELECTRODE
102L TRAY GUIDE RAIL (TRAY GUIDE MEMBER)
102R TRAY GUIDE RAIL (TRAY GUIDE MEMBER)
110 TOP PLATE
111 and 112 REINFORCING MATERIAL
121, 122 CUSHIONING MATERIAL
131L RAIL (PROTRUSION PORTION)
131R RAIL (PROTRUSION PORTION)
132L HANDLE
132R HANDLE
140 TRAY
140L ACCOMMODATION REGION
140R ACCOMMODATION REGION
141L BATTERY GUIDE RAIL (BATTERY GUIDE MEMBER)
141R BATTERY GUIDE RAIL (BATTERY GUIDE MEMBER)
142L RAIL (PROTRUSION PORTION)
142R RAIL (PROTRUSION PORTION)
143 MOUNTAIN PORTION (STOPPER PORTION)
H AXLE HEIGHT
Hb BATTERY MIDPOINT HEIGHT
Ho GROUND CONTACT SURFACE
L INTER-AXIS LINE DISTANCE
Lb BATTERY SIDE SURFACE LENGTH
Mb MIDPOINT
Q1 POWER SUPPLY POSITION
Q2 TAKE-OUT POSITION

The invention claimed is:

1. An autonomous travel device comprising:
wheels;
a device main body;
a power source that is provided on one end portion of the device main body within the device main body and causes the device main body to travel autonomously by driving the wheels;
a battery for supplying power to the power source; and an accommodation unit for accommodating the battery from another end portion of the device main body to a central portion of the device main body within the device main body.

2. The autonomous travel device according to claim 1, wherein
a distance from a ground contact surface of the wheels up to a midpoint in a height of the battery is shorter than a distance from the ground contact surface up to axis lines of axles of the wheels.

3. The autonomous travel device according to claim 1, wherein
a length of a side surface of the battery is longer than half a distance from an axis line of an axle of a front wheel of the wheels up to an axis line of an axle of a rear wheel of the wheels.

4. The autonomous travel device according to claim 1, wherein
a protrusion portion formed along a side surface of the battery in a length direction is provided on the battery,
a battery guide member formed in a portion that corresponds to the protrusion portion of the battery is provided in the accommodation unit so as to guide movement of the battery within the accommodation unit, and
a door, which is openable and closable, for covering the accommodation unit in which the battery is accommodated is provided in the another end portion of the device main body.

5. The autonomous travel device according to claim 4, further comprising:
an opening and closing detection unit that detects opening and closing of the door; and
a control device that supplies power of the battery to a power source in a case in which, as a detection result, the door is closed.

6. The autonomous travel device according to claim 4, further comprising:
a battery movement unit that moves the battery from a power supply position for supplying power from the battery to the power source to a take-out position for taking the battery out of the device main body when the door is open.

7. The autonomous travel device according to claim 1, wherein
a protrusion portion formed along a side surface of the battery in a length direction is provided on the battery,
a tray for accommodating the battery is provided in the accommodation unit,
a battery guide member formed in a portion that corresponds to the protrusion portion of the battery is provided on an inner wall portion of the tray so as to guide movement of the battery within the tray, and
a door, which is openable and closable, for covering the accommodation unit in which the battery is accommodated is provided in the another end portion of the device main body.

8. The autonomous travel device according to claim 7, wherein
a handle is provided on a front surface of the battery,
a stopper portion is provided on an end portion of the tray on a door side, and
the stopper portion prevents the battery from dropping out from the tray when the battery is drawn out with the tray by the handle of the battery being pulled when the door is opened.

9. The autonomous travel device according to claim 8, wherein
a top plate is provided in the device main body as an upper surface thereof, and
the top plate prevents the battery from being raised upward to a predetermined height when the battery is drawn out from the tray over the stopper portion.

10. The autonomous travel device according to claim 9, wherein
a cushioning material is provided in the vicinity of an end portion of the top plate on the door side, and
the cushioning material cushions an impact of the battery on the top plate when the battery is drawn out from the tray over the stopper portion.

11. The autonomous travel device according to claim 7, further comprising:
an opening and closing detection unit that detects opening and closing of the door; and
a control device that supplies power of the battery to a power source in a case in which, as a detection result, the door is closed.

* * * * *